US008869038B2

(12) United States Patent
Eick

(10) Patent No.: US 8,869,038 B2
(45) Date of Patent: Oct. 21, 2014

(54) PLATFORM AND METHOD FOR ANALYZING REAL-TIME POSITION AND MOVEMENT DATA

(75) Inventor: Stephen Gregory Eick, Naperville, IL (US)

(73) Assignee: VisTracks, Inc., Lisle, IL (US)

( * ) Notice: Subject to any disclaimer, the term of this patent is extended or adjusted under 35 U.S.C. 154(b) by 405 days.

(21) Appl. No.: 13/267,660

(22) Filed: Oct. 6, 2011

(65) Prior Publication Data
US 2012/0089920 A1 Apr. 12, 2012

Related U.S. Application Data

(60) Provisional application No. 61/404,601, filed on Oct. 6, 2010.

(51) Int. Cl.
*G06F 3/14* (2006.01)
*G06T 11/20* (2006.01)
*G06F 9/44* (2006.01)
*G08G 1/00* (2006.01)

(52) U.S. Cl.
CPC .............. *G08G 1/20* (2013.01); *G06T 11/206* (2013.01); *G06F 8/30* (2013.01)

USPC .............. 715/739; 715/751; 706/50; 345/111

(58) Field of Classification Search
CPC .................................... G06F 3/14; G06F 3/17
USPC .......... 715/200–277, 700–867; 700/701–866; 709/201–229; 705/50–79; 345/30–111; 706/50

See application file for complete search history.

(56) References Cited

U.S. PATENT DOCUMENTS

2008/0222074 A1\* 9/2008 Lieberwirth et al. ........... 706/50
2011/0055722 A1\* 3/2011 Ludwig ......................... 715/751

\* cited by examiner

*Primary Examiner* — Ruay Ho
(74) *Attorney, Agent, or Firm* — Carmen Patti Law Group, LLC

(57) ABSTRACT

A geospatial platform for building applications involving location and time is disclosed. The applications allow users to analyze and make sense of the location and time-based data generated by a wide variety of devices in real time, as it is generated. The platform in one example features a dashboard for associating code statements with a variety of data visualizations. The code statements access real-time and/or location based data and generate a result set that is optimized for displaying a selected data visualization in the dashboard. The code statements are ideally executed on a server so that large quantities of data can be manipulated as it is generated by various devices in real-time.

11 Claims, 25 Drawing Sheets

```
select astext(traj) as wkt,
       5 as strokewidth,
       'red' as strokecolor
```

|   | wkt<br>text | strokewidth<br>integer | strokecolor<br>unknown |
|---|---|---|---|
| 1 | LINESTRING(-87.62456599 | 5 | red |
| 2 | LINESTRING(-87.61008739 | 5 | red |
| 3 | LINESTRING(-87.61008739 | 5 | red |

| | |
|---|---|
| *wkt* | Well known text – geospatial primitive |
| *independent* | Independent variable for business graphics |
| *dependent* | Dependent variable for business graphics |
| *pointshape* | Shape of points displayed on map |
| *imageheight* | Height of image on map |
| *imagewidth* | Width of image on map |
| *nodecolor* | Color of points on map |
| *fillcolor* | Fill color of map polygons or other shapes |
| *fillopacity* | Opacity of map polygons or other shapes |
| *strokecolor* | Stroke (outline) color for polygons and other shapes |
| *strokewidth* | Stroke width in pixels |
| *highlightfillcolor* | Color, usually yellow, when user mouses an object |
| *highlightfillopacity* | Opacity of highlightcolor |
| *highlightstrokewidth* | Strokewidth, usually 2, when user mouses an object |
| *highlightstrokeopacity* | Stokeopacity, usually 1.0, when user mouses an object |
| *selectedfillcolor* | Color, usually yellow, when user selects an object |
| *selectedfillopacity* | Opacity of selected color |
| *selectedstrokewidth* | Strokewidth, usually 2, when user mouses an object |
| *selectedstokeopacity* | Stokeopacity, usually 1.0, when user mouses an object |
| *dasharray* | Style for drawing lines |
| *tooltip* | Tooltip to appear when mouse touches object |
| *title* | Title for tooltip window |

Figure 7

```
select extract(dow from event_date) as independent,
       avg(crossing_delay::double precision) as dependent
from my_fact_field f, my_asset_fact mf
     where id=fact_id AND name = 'CALLLENGTH'
     group by independent
     order by independent;
```

```
-- Query 1 (upper left heat map)
select * from vt_heatmap('select astext(location) as  wkt from
vt_getCurrentPositions()', 'county', 'PuOr');

-- Query 2 (upper right heat map)
select * from vt_heatmap('select astext(location) as  wkt from
vt_getCurrentPositions()', 'state', 'Spectral');

-- Query 3 (lower left heat map)
select * from vt_heatmap_census('hispanic', 'Atlanta', 'GA', 'tract',
'Oranges');

-- Query 4 (lower right heat map)
select * from vt_heatmap_image('select astext(location) as  wkt from
vt_getCurrentPositions()', 'state', 'Oranges', %WIDTH, %HEIGHT);
```

Figure 17A

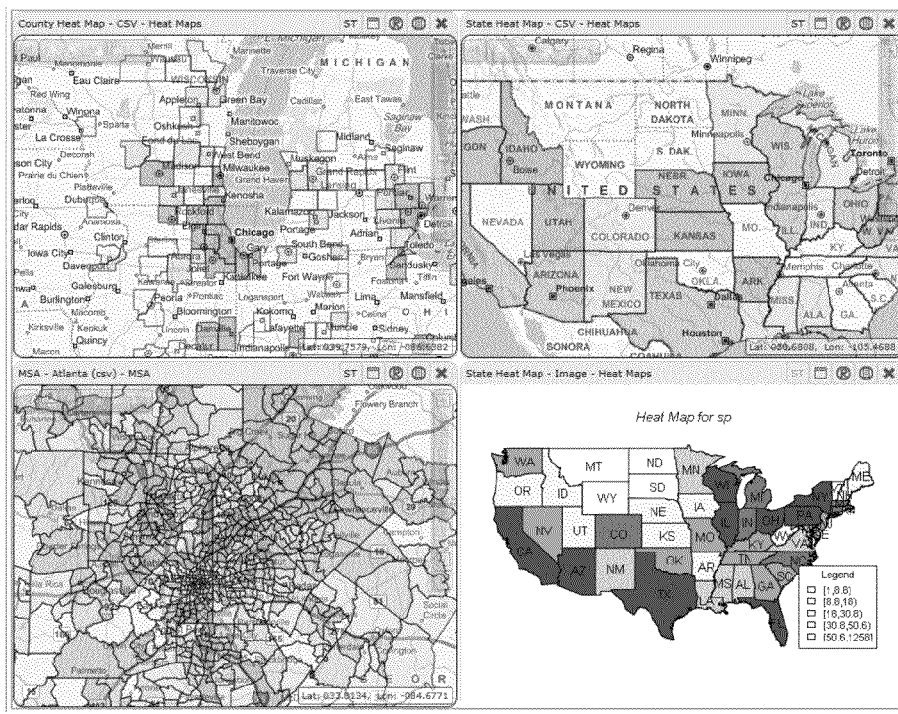

Figure 17B

PLATFORM AND METHOD FOR ANALYZING REAL-TIME POSITION AND MOVEMENT DATA

CROSS-REFERENCE TO RELATED APPLICATIONS

This application claims priority to U.S. Provisional Patent Application No. 61/404,601 filed Oct. 6, 2010.

This application contains subject matter that is related to the subject matter of the following applications, which are assigned to the same assignee as this application. The below-listed applications are hereby incorporated herein by reference in their entireties:

"TIMELINE VISUALIZATIONS LINKED WITH OTHER VISUALIZATIONS OF DATA IN A THIN CLIENT," by Fugitt et al. application Ser. No. 11/725,119 filed Mar. 16, 2007.

"ANALYSIS OF TIME-BASED GEOSPATIAL MASHUPS USING AD HOC VISUAL QUERIES," by Decherd et al. application Ser. No. 12/005,334, filed Dec. 26, 2007.

"PLATFORM FOR REAL-TIME TRACKING AND ANALYSIS", by Ratliff et al, application Ser. No. 12/070,976 filed Feb. 22, 2008.

BACKGROUND

Recently with the widespread emergence of personal navigation devices (GPSs), mashups created with Google maps, location-based services, and new mobile devices, large quantities of time-stamped geoencoded data have become available for analysis. Time-stamped geoencoded data are quite common and include, for example, the sequence of waypoints generated by a GPS, time-stamped leaks along a gas pipeline, the scheduled deliveries and their times of a delivery vehicle, measurements of energy usage from household thermostats through the energy distribution network back to the power plants, the positions of miners with active RFID badges in a large underground mine, customer purchases through time geoencoded by customer address, and even item sales encoded with aisle, shelf, and position within a retail store. This class of data is fairly common and involves sequences of events in time with various spatial types of spatial constraints on the positions. For example, vehicle-based GPS positions will (for the most part) be constrained to be on road or at known addresses. Items in a store are normally on shelves positioned in aisles.

One way to display and analyze time-stamped geoencoded data is to create a mashup using Google's or Microsoft's web-based mapping applications. Unfortunately, these platforms do not permit deep time-based analysis. The problem is that these web mapping applications are intended to show positions on a map, to support searching, to provide directions, and to serve up local ads. Both Google's and Microsoft's sites are advertising supported. Thus the APIs for these applications are optimized to serve up relevant ads. Additionally, the content in these images is static. It is not possible to generate a custom image tile that combines real-time information with static content using Google, Microsoft or others' web-based mapping API. Using these platforms, it is not possible to correlate geospatial information by time, by event type, by trend, etc., to discover important analytical relationships.

Traditional geographical information system (GIS) systems are also not designed for web-based analysis of time-oriented geospatial business intelligence data. These applications are often overwhelming complex, run on high-end desktop workstations, require specialized programming experience to create/modify and are optimized to analyze geospatial layers. However, computing is in the midst of a massive change as the traditional desktop systems are moving to a server-based computation model where desktop software is being replaced by rich web 2.0 browser-based interfaces delivered to mobile devices. What is needed for most users are lightweight, web-based tools that enable time-stamped geospatial information to be encoded and analyzed within a web page on a spatial canvas, for example, a traditional Google or Microsoft map or a nontraditional map such as a floor plan, layout of a coal mine, or even a multistory building.

SUMMARY

Web-based tools can be delivered in a hosted or cloud-based computing environment and used for manipulating, analyzing, understanding, and taking action with time-stamped, spatial data involving location, movement, and tracking through time. Described herein is a web-based geospatial platform for enabling users to build applications involving location and time data. The geospatial platform is aware of position and movement data structures, shows real-time information and is configurable by users without the need for complex programming tools and engineering support.

The invention in one implementation encompasses an apparatus. The apparatus comprises a server for executing code that selects data and formats it according to a chosen data visualization, display for showing data visualizations which can be selected by a user of the display and an input device for matching a data source with a data visualization and choosing a code to execute on the data source.

The invention in another implementation comprises geospatial platform for creating data analysis applications for visualizing time and location data sets, further comprising a server for receiving a plurality of time and location data sets from a plurality of sources, and for executing code statements that select data from a selected data set of the plurality of time and location data sets and format it according to a data visualization, a computing device, coupled to the server, having a display for showing a plurality of data visualizations which can be selected and a plurality of code statements which can be selected, said display also showing data visualizations based on the execution of code statements by the server and an input device for choosing a code statement and matching it with the selected data set and the selected data visualization, then sending the code statement to the server for execution.

Another implementation of the invention encompasses a method for creating real-time data analysis applications by a developer using a computing device, comprising the steps of: displaying a list of one or more data visualizations on the computing device, displaying a list of one or more time-stamped data sets on the computing device, entering into the computing device, by a developer, a code statement describing an association between a selected data visualization and a selected data set, executing the code statement by a server operatively coupled to the computing device, the server accessing the data set and creating a results set which is bound to the properties of the data visualization, and returning the results set to the computing device for display and interaction by the developer.

In a further embodiment, the invention comprises a method comprising the further steps of writing a code statement in SQL or R, and writing the code statement so that it can execute repeatedly so that the data visualizations are updated on the display in real-time.

In another embodiment, the invention comprises a method for dreating real-time wireless data analysis applications, comprising the steps of: providing a dashboard on a computing device, the dashboard including one or more data visualizations and a list of one or more time-stamped data sets; entering into the dashboard, by the developer, a code statement for accessing selected data from a specific time-stamped data set; dragging, by the developer, the code statement and dropping it onto a selected data visualizations from the list of visual metaphors; executing the code statement and generating a result set, based on the selected time-stamped data set, which is used to display the selected data visualizations on the computing device.

DESCRIPTION OF THE DRAWINGS

Features of example implementations of the invention will become apparent from the description, the claims, and the accompanying drawings in which:

FIG. 7 is a representation of a table showing an example of column names used to generate result sets.

FIGS. 17A-B are a representations of code statements and the data visualization of the results of executing the code statement for generating a heat map.

DETAILED DESCRIPTION

Figure 1:
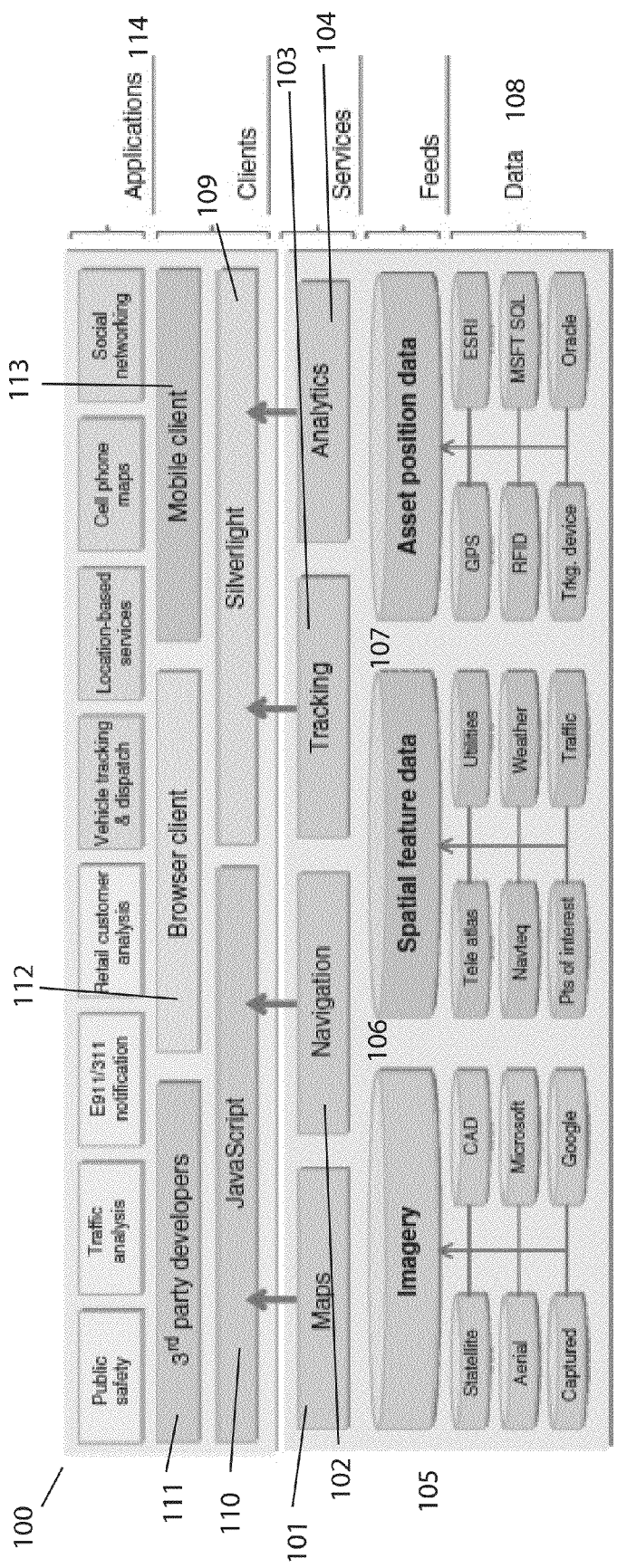
FIG. 1 is a representation of one embodiment of an apparatus that comprises a client-server technology platform.

Turning to FIG. 1, a geospatial analytical platform for enabling users to create applications involving location and time-based data in one embodiment comprises a client-server technology platform 100. The platform includes four servers backed by spatial databases. The software stack, shown in FIG. 1, includes map 101, navigation 102, tracking 103, and spatial analytics 104 servers. Map server 101 is a light weight, fast, highly optimized web mapping server which generates high-quality maps using imagery, roads, household locations, places of interest, floor plans, or other spatial inputs. The maps are delivered to the clients as image tiles through asynchronous http requests. Map server 101 provides the ability to generate custom maps which provide the background, for example, the spatial canvas in the clients. The advantage of a map server over traditional desktop systems is that complicated database lookups and rendering tasks are performed on cloud-based servers thereby reducing the need for client-based computing resources.

The backdrop for spatial analysis is a spatial canvas. The spatial canvas, either a traditional or nontraditional map, is consumed by the client as image tiles. Map server 101 of FIG. 1 provides a capability to generate high-quality customized image tiles. It is engineered to support Web 2.0 applications and does imagery, feature data rasterization, and spatial layer merging and manipulation. It supports source data from NAVTEQ, TeleAtlas, ESRI Shape files, KML, GeoRss, GeoTIFF, JPEG2000, and other common feature and raster formats.

Some key features of map server 101 are as follows.

It provides image tiles rendered according to the selected layer and style.

It renders thousands of features including points, lines, and polygons into layers for consumption in browser and other clients.

It uses styled layer descriptor (SLD) files, an OGC standard, to determine the styling rules at specific zoom levels.

It generates composite layers by merging the layers into a single image with various translucent levels.

It improves performance using caching, pre-caching, and support for Web Mapping Service-Cached (WMS-C) tile caching.

It includes tools to simplify complex polygon features to improve rendering performance.

Although there are other open source and commercially available map servers, map server 101 has several interesting features and extensions for spatial analysis. The first involves rasterizing thousands of real-time data points.

There are many use cases where it is desirable to display large datasets on a map background, for example, displaying the locations of all households in a large city, showing the detailed breadcrumb trail of a fleet of moving vehicles, or displaying the polyline representing the exact border between the USA and Canada. Because of network bandwidth constraints, it is not possible to move large feature datasets to a browser or mobile client for analysis, and, even if the data could be transferred, the clients will not have sufficient computational resources. The analytic platform has the capability to issue a spatial query, retrieve the most recent value of a spatial dataset, and then rasterize it and generate image tiles that are streamed to the client.

A second feature of map server 101 is the use of Styled Layer Descriptor (SLD) files, an Open Geospatial Consortium (OGC) XML standard for specifying styling rules to determine how feature data are rendered at different zoom levels. Map Server 101 implements this standard and uses SLD files to change styling so that progressively more detail can be shown at higher zoom levels. As an example, in FIG. 15, SLD styling rules cause the locations of schools, libraries, and fire districts, and cities to be extracted from the spatial database. The schools are drawn as brown diamonds, libraries as red diamonds, fire districts as red polygons, and cities as medium red circles at zoom levels 4-8. However, at zoom levels 15 and higher the styling rules specify that the locations of individual houses should be drawn as dots.

There are three advantages of using SLD styling files and a spatial database over the fixed raster formats provided by Microsoft and Google's mapping platforms. First, the style of the base map is not fixed and can be changed by modifying a single SLD file. Second, modifying the SLD files enables the look and feel of the image tiles to vary by zoom level. In this way, progressively more content can be included in the image tiles at higher zoom levels. Third, the styling rules can be configured to include dynamic content such as the current traffic conditions, local road repairs, or even events such as a block party or baseball game.

Figure 15:
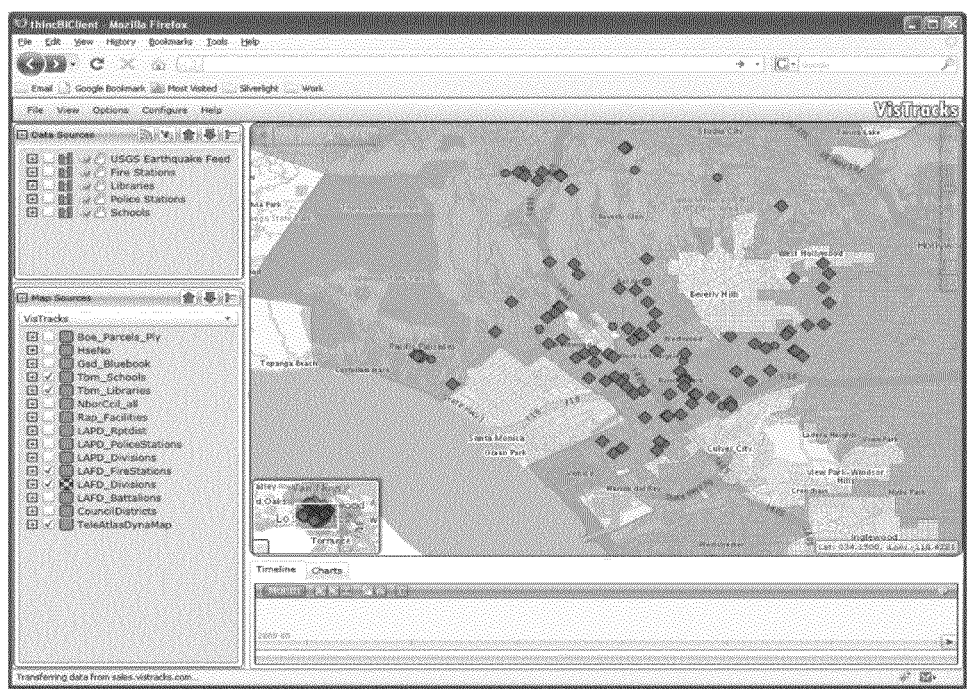
FIG. 15 is a representation of a data visualization showing the locations of schools, libraries, fire districts, and cities.

A third feature of map server 101 is, as an extension to the WMS standard, map server 101 will merge multiple layers together, set the opacity of various layers, and return the composite as an image tile. For example, FIG. 15 shows a composite image combining the Tele Atlas road data, Los Angeles fire department divisions rendered as a partially transparent red layer, locations of fire stations, schools, and libraries. In the user interface the order of the layers on the Map Sources plug-in determines the order of the layers on the composite image.

The architecture also includes a navigation server 102 which performs geocoding, reverse geocoding and calculates turn-by-turn directions. By implementing a navigation server, the apparatus can incorporate drive times, traffic, road conditions, and customized routes into the analyses. Navigation server 102 also provides an understanding of common routes, shortest paths, and drive-by locations.

A critical component of many location-based analyses will involve finding locations, computing driving directions, finding routes, analyzing driving times, and understanding common paths. Navigation server 102 of FIG. 1 includes several features to support these tasks. It provides geocoding for converting addresses, intersections or place names to a longitude and latitude and reverse geocoding for translating a longitude and latitude to an address. It also provides path finding which calculates the 'best' route between two locations where the definition of 'best' might depend on current traffic levels, type of vehicle, road conditions, bridge capacities and turn-by-turn directions for converting a path into human understandable instructions.

A first function of navigation server 102 is geocoding. Geocoding a street address is the most basic functionality of the geocoder. This functionality will find the geo coordinates, for example, longitude and latitude, for a particular address, partial address, intersection, or 'well known' place. The way geocoders work is that data vendors such as Tele Atlas, NAVTEQ, or the US Census with their Topological Integrated Geographic Encoding and Referencing (TIGER) datasets provide the address ranges of every street segment. Addresses are matched to street segments and then the address range is interpolated to find the location of an individual address. In some cases, the actual addresses for individual parcels are available and can provide an exact match.

There are three challenging aspects to building a commercial-grade encoder. The first problem is address parsing. The geocoder needs to perform partial address parsing, for example, in the addresses:

801 Warrenville Road, Lisle, Ill.

801 Warrenville Road, 60565 the required fields are either the city and state or the zip code. Optional fields include the street number, street name, street type (street, avenue, court, and so on), direction (east, north, south, west), etc. The geocoder should return the parcel centroid for exact address matches, city or zip code centroid for partial names, or latitude and longitude of the interpolated location for an address along a street segment.

The second problem is to handle misspellings and partial matches. The approach is to use Soundex to parse names using phonetic matches and Levenshtein distance for misspellings. Soundex is an algorithm for finding a word that 'sounds' like another and Levenshtein distance is an algorithm to determine how many character (add/remove/substitute) modifications a word would require to match another word. For example, the Levenshtein distance between Alberqerque and Albuquerque is 3 and between Pitts-berg and Pittsburgh is 2. For geocoding, if exact matches and Soundex matches return no results, Levenshtein is used to find matches where the Levenshtein distance is less than a threshold value.

The third problem is to geocode 'well known' places. For example, the Sears Tower in Chicago is a well known place with a specific address downtown in the Chicago loop. We use the GeoNames database which contains the locations of over 8 million place names to geocode well known places.

A second function of navigation server 102 is reverse geocoding which maps a location, for example, latitude and longitude, to the closest street address. Common reverse geocoding tasks involve finding the nearest address, nearest well known place name, nearest neighborhood, closest intersection, or closest street.

A third function of navigation server 102 is path finding. This is the process of determining a path through a graph (the road network) from a starting point to a destination. A proper implementation will honor one-way streets and turn restrictions. There are several popular algorithms for finding a path through a graph. Navigation server 102 includes a well known algorithm called A* (A Star).

A* is a best-first, graph search algorithm that finds the least-cost path from a given initial node to a goal node. It uses a distance-plus-cost heuristic function, usually denoted $f(x)$, to determine the order in which the search visits nodes in the tree. The distance-plus-cost heuristic is a sum of two functions: the path-cost function [usually denoted $g(x)$, which may or may not be a heuristic] and an admissible 'heuristic estimate' of the distance to the goal, usually denoted $h(x)$. The path-cost function $g(x)$ is the cost from the starting node to the current node. Since the $h(x)$, part of the $f(x)$ function, must be an admissible heuristic, it must not overestimate the distance to the goal. Thus for an application like routing, $h(x)$ might represent the straight-line distance to the goal, since that is physically the smallest possible distance between any two nodes.

Navigation server 102 is capable of including weighting factors such as current traffic conditions that influence the cost of each road segment, time to make left and right turns, time of day effects, etc. By modifying these weights, a user can tailor the routing algorithm to particular use cases and, for example, generate the optimal route for an emergency vehicle which does not have to stop for red lights as well as bikes which have lower speeds than regular vehicles.

A fourth function of navigation server 102 is its capability to generate turn-by-turn directions, i.e. the process of taking a path through the road network graph and generating human readable directions including street names and left/right turn directions. For example, the turn-by-turn for the path between 801 Warrenville Road, Lisle, Ill. to Sears Tower (331 S Franklin St, Chicago, Ill.) is:

go west on Warrenville Road 0.4 ml;
turn right at IL-53/Lincoln Avenue 72 ft;
take the ramp onto 1-88 E Toll Road 10.9 ml;
merge onto 1-290 E 13.9 ml;
take the Franklin St exit 0.1 ml;
turn right at S Franklin St;
arrive at 331 S Franklin St.

A tracking server 103 of FIG. 1 is also included for ingesting sensor feeds including positions of high-value assets and associated attributes, saving the data to a spatial database, and generating alerts using a configurable rules engine. Tracking server 103 also monitors real-time sensor feeds including position, speed, elevation, direction, and other sensor outputs.

With the widespread deployment of GPS, RFID, and other sensor technologies, it has become technically feasible and cost effective to track moving objects. This function is accomplished by tracking server 103 of FIG. 1. Some of the position information contains true sequences of longitude and latitude positions of a moving object. Other information is less precise and only indicates that an object passed through a reader, for example, a car with an RFID IPass tag passing through a tollbooth. The sensors are smart devices and there are frequently other variables associated with the positions such the instantaneous speed, elevation, temperature, etc. Although GPS and RFID are perhaps the most widely recognized location systems, they are examples of what is rapidly becoming a wide variety of sensor and tagging systems that provide real-time location information.

The tracking server accepts live position and sensor data from a variety of sources including RFID, GPS, and other location systems. It fuses, de-conflicts, normalizes, and saves the locations to a spatial database for each tracked object. It includes a rule-based alerting engine with geofences to assets, locations, zones, etc., and provides alerts. The client shows the positions of objects, assets, personnel, or vehicles for display in a Web 2.0 portal with breadcrumb paths on a geospatial substrate such as a map, building floor plan, warehouse layout, etc. It provides forensics, replay capability, and time-based visual intelligence tools for analyzing the historical positions of objects and showing the progression of an incident.

Analytics server 104 accesses the algorithm R to provide deep spatial analytics.

The architecture is a three tier architecture with spatial databases 105-108, servers 101-104, and web-based and mobile clients 109-113. A variety of applications, for example, those shown as the group 114, may be built on top of the web-based and mobile clients. Spatial databases 105-108 include imagery data 105, spatial feature data 106 and asset position data 107 which receive input from a wide variety of sources, for example, those shown collectively at 108. Examples of imagery data sources include satellites, cameras and CAD systems. Examples of spatial data sources include weather, utilities, landmarks and traffic info while examples of asset position data include GPS, RFID and other tracking devices. The servers, data feeds, and spatial databases provide services and can run within an enterprise or are accessible on the internet. Clients access the servers through web services, well-defined http requests, or representational state transfer (REST) calls. The advantage of a distributed approach where the servers provide spatial computing resources is that complex computations are performed using powerful servers that are not possible to perform on browser clients or mobile devices.

To present spatial information to users, both JavaScript 110 and Silverlight 109 clients may be provided, although other web-based applications may be used. The web-based clients show real-time geospatial information in a wide variety of ways, including on a lightweight map, on a timeline, and in linked analysis charts. Presenting the information in multiple views enables analysts to correlate the dimensions and discover relationships that are hidden when the data are displayed in a single perspective. As a result, they are able to perform richer and deeper analysis. This enables users to find patterns that are hidden in existing presentations. This linked-view visualization technique is totally browser-based and targets time-based spatial data. In addition to maps, we have developed a set of thin client visualization components, for example, timeline, time wheel, node and link graphs, streaming imagery from IP cameras, and standard business charts that work with the web application to provide a rich analysis environment. These components allow the web-based Silverlight application to be as responsive and dynamic as Web 1.0 large desktop applications.

The web client implements and extends many of the ideas embodied in traditional mashups. It can ingest live or static data from several different sources and present it for rich analysis. Analysts may edit and annotate the information in the web application and thereby create shared work products. The edits and annotations propagate automatically to other browsers on the site.

Figure 2:
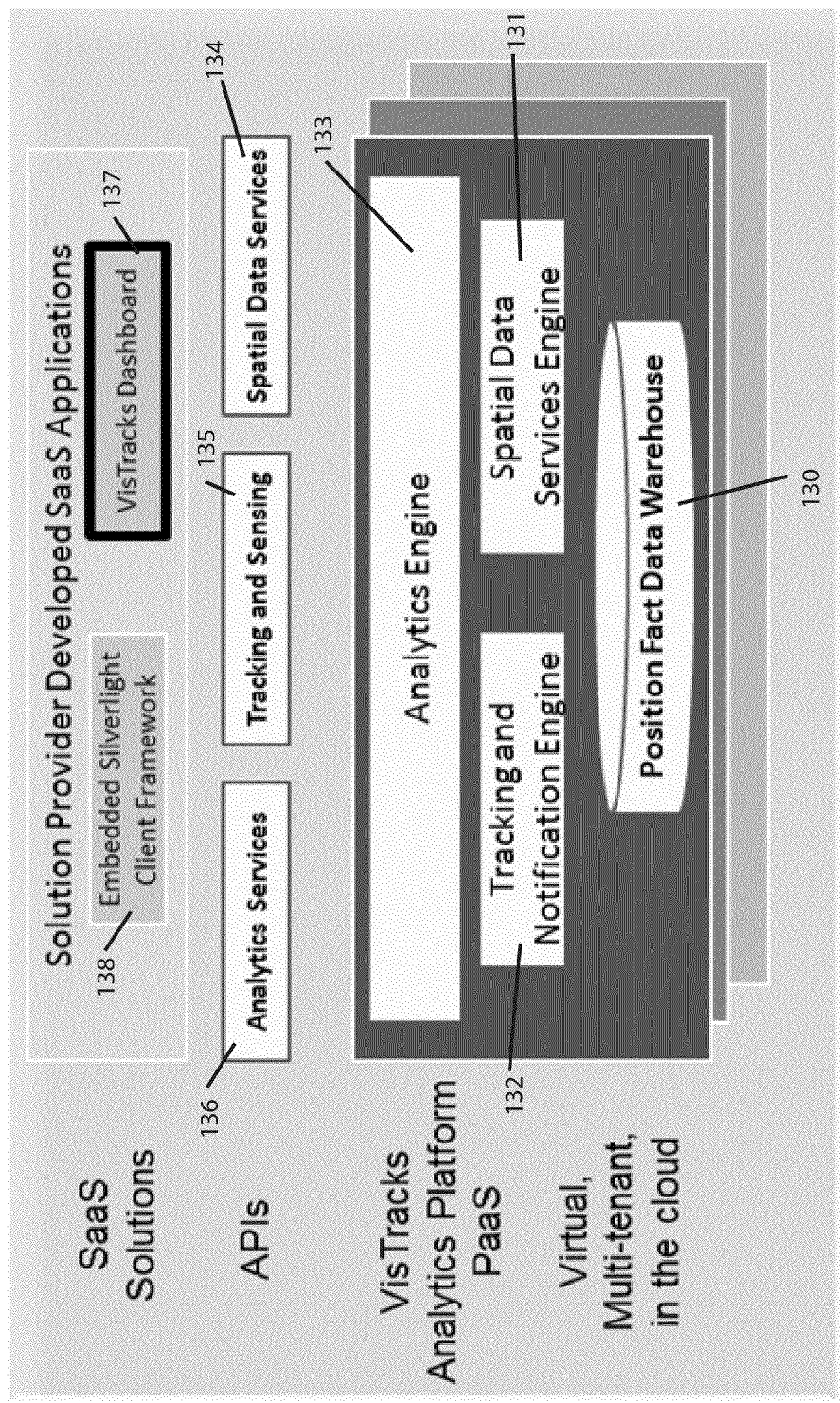
FIG. 2 is a representation of another embodiment of the components geospatial platform for creating wireless data applications.

FIG. 2 shows another embodiment of a web-based analytics platform engineered to analyze real-time position and movement data. This class of platform, e.g. a platform that enables Software as a Service (SaaS) solutions to be created, is commonly referred to as Platform as a Service (PaaS). The architecture shown in FIG. 2 includes five components.

A position fact data warehouse 130 stores sequences of time-stamped records, or position facts, that are delivered over wireless networks as a stream. The position facts are organized into a multi-tenant position and movement web-based database having internal data structures including entity trajectories, stop points, and movement signatures that are specifically tailored to this class of data. These data structures characterize entity position and movement patterns.

Tracking and Notification Engine 132 and Spatial Data Services Engine 131 provide analysis of distance, speeds, locations, movement trajectories, historical locations, correlations, variability, and movement predictions. Many of the functions are implemented by adding primitives to Position Fact Data Warehouse 130.

Analytics Engine 133 contains several types of statistical algorithms. The analytics engine automatically analyzes incoming position facts, characterizes movement patterns, segments the movements, and adaptively learns from the data. Analytics Engine 133 also includes a programmable rules engine with complex logic that enables it to create actions. For example, the actions might be to trigger an alert, send a mobile subscriber a SMS, trigger an alarm, send an email message, generate a list, etc.

Each of the APIs in 134-136 are exposed to application developers using services 133, 132, and 131. These APIs enable developers to integrate tracking services 135, spatial data services 134 and analytics engine 133 to author applications.

Finally, SaaS solutions include a dashboard 137 and an embedded Silverlight Client Framework 138 that is created by publishing new applications authored in the dashboard environment 137. These SaaS solutions may be embedded in other applications or run as a standalone web page.

Through the use of the analytics platform of FIGS. 1 and 2, users can both develop a geospatial analytic application, and use and/or modify the applications to study real-time data after it has been created. Dashboard 137 is the main interface for interacting with the analytics platform and is described in further detail in connection with FIG. 3.

Figure 3:
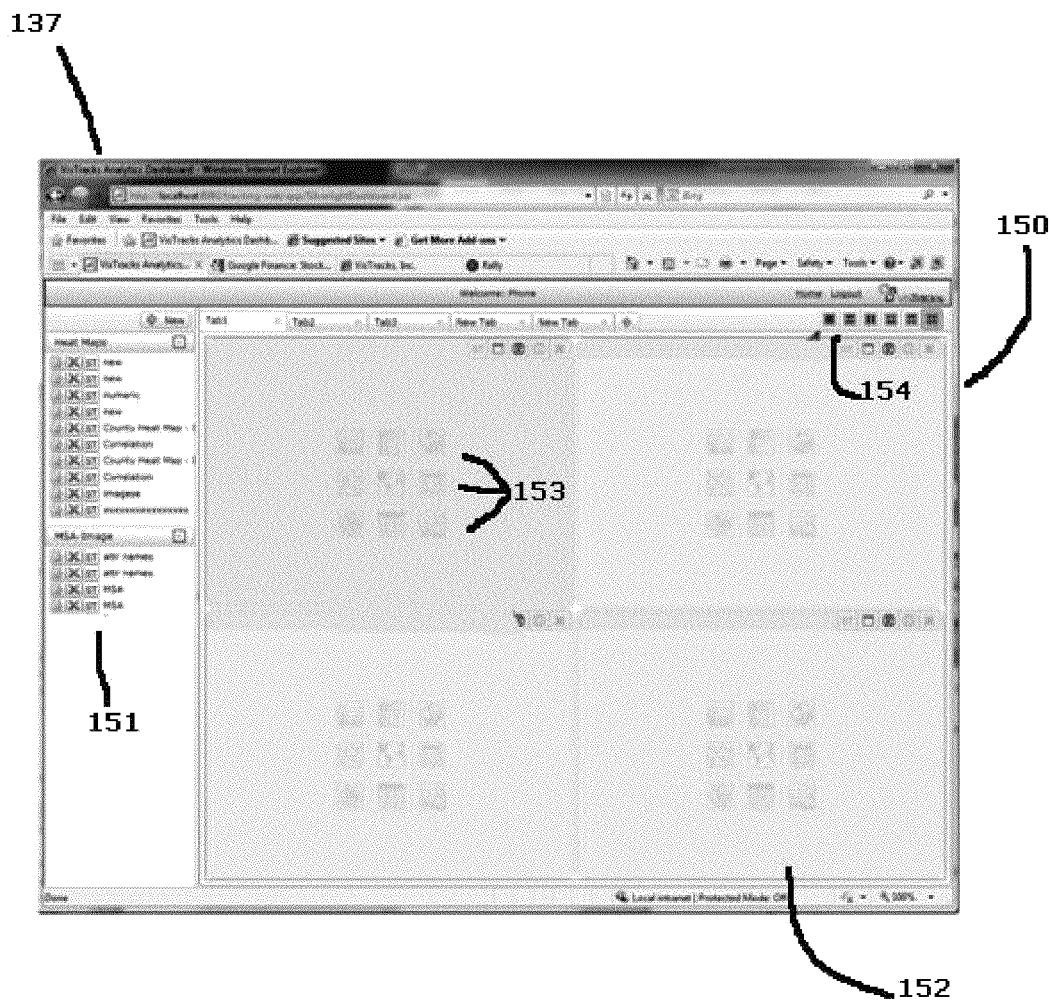
FIG. 3 is a representation of a dashboard of the geospatial platform.

Dashboard 137, shown in FIG. 3 which depicts a web browser window 150. The browser window is a configurable client which allows users to analyze position and movement data. There are three main sections in the browser window 150. On the left there is a section 151 for dashboard code statements, to be explained below. The main display 152 includes one or more windows which contain a plurality of visualizations 153 which can be selected by a user for displaying data. As explained above, these visualizations may include timeline, time wheel, node and link graphs, streaming imagery from IP cameras, and standard business charts, for example. They may also include bar charts, pie charts, scatter plots, geospatial maps, text-based displays and statistical algorithms. Browser window 150 also includes a toolbar 154 which includes controls that determine the layout of dashboard 137.

Code statements 151 are snippets of code, for example, either SQL queries or R statistical algorithms, that are written by a user of the dashboard. Although a wide variety of database access protocols can be used to access the spatial database, the following description is drawn to SQL and R. When using the platform to develop geospatial analytic applications, a user writes code statements 151, then uses a pointing device to drag them across the dashboard and dropt them on a data visualization to be used to display the data. At this point, the code statement is transferred to a server (not shown) which executes the code statement and generates a results set, either a table for SQL queries or an image for R code. The result is displayed in the appropriate window of main display 152.

Figure 4:
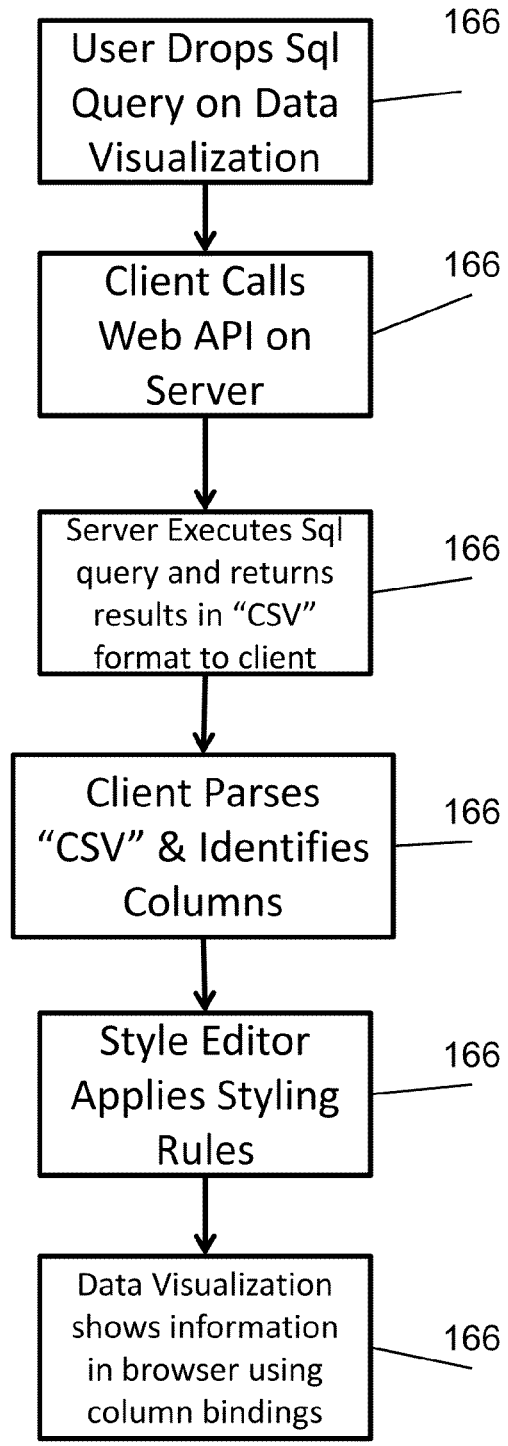
FIG. 4 is a representation of one process flow for implementing the execution of code statements in SQL by the geospatial platform.

The process whereby a code statement is executed is shown in FIG. 4. Starting with step 160, a user drops a code statement, for example, an SPL Query, on a data visualization. Then the client, i.e. the analytics platform or application running in a web browser, calls a Web API on a server in step 161. The server then executes the code statement in step 162 and sends results in an appropriate format back to the client. In step 163, the client parses the results, a table in the case of an SQL query, and identifies the columns. A style editor applies style rules to the display of result data in step 164 while the composite data visualization is displayed in the browser window in step 165.

Figure 5:
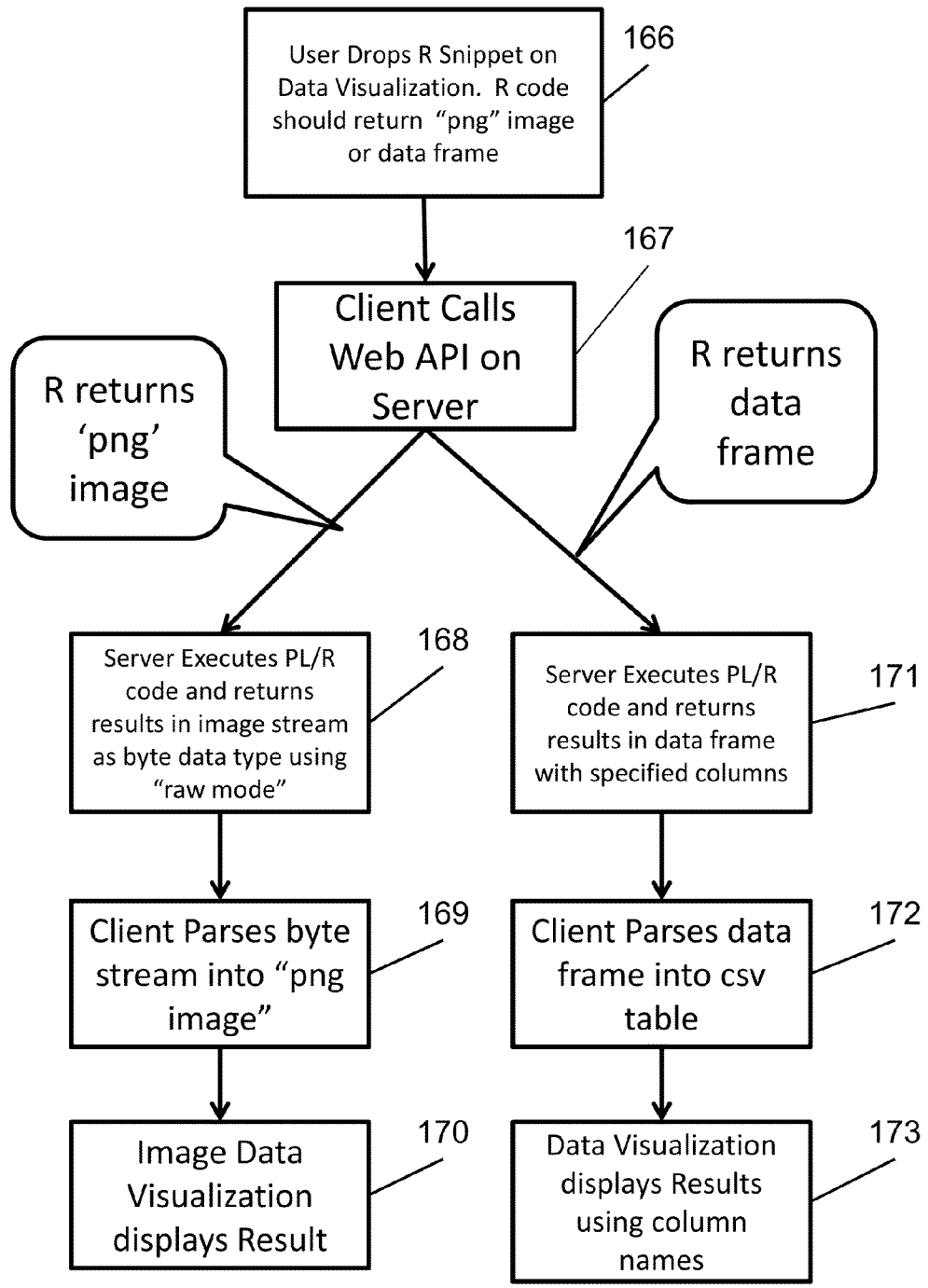
FIG. 5 is a representation of one process flow for implementing the execution of code statements R by the geospatial platform.

The analytics platform also provides the capability to process code statements written in the R statistical programming language. This allows the platform to integrate a deep statistical capability into the dashboard displays. The process is shown in FIG. 5. The process begins in the same way in steps 166-167 where a code statement is dropped onto a selected data visualization and then sent to a server for execution. In one case, R graphics capability can be used to create custom statistical visualizations as shown in steps 168-170. In this case, the last line of the R code statement will typically generate a png image which is passed to the client as a byte stream. The client will interpret the byte stream and display it as an image using the image visual metaphor.

An R code statement can also perform arbitrary statistical analysis on position and movement data with the results being transferred back to the client a data frame in step 171-173. The client parses the data frame for column headings and displays the results of the code execution using the desired data visualization.

The most common uses of the statistic capability are to correlate variables of calculate a statistical distribution. Thus, the following R code statement is the first few lines of a function that will calculate the statistical distribution by hour of day of the boarder crossing delays for large class 5 trucks between the USA and Canada.

```
vtCross HOD<-function(which="both")
{
tix<-getTIZ( )
# just focus on trips with a single crossing
one <-name(table(tiz$tripid))[table(tiz$tripid)==1]
one <-as.integer(one)
tizone<-tiz[tiz$tripid %in% one, ]
if(which=="us")
tizone<-tizone[tizone$origin=="us",]
else if (which=="ca")
```

Figure 5B:
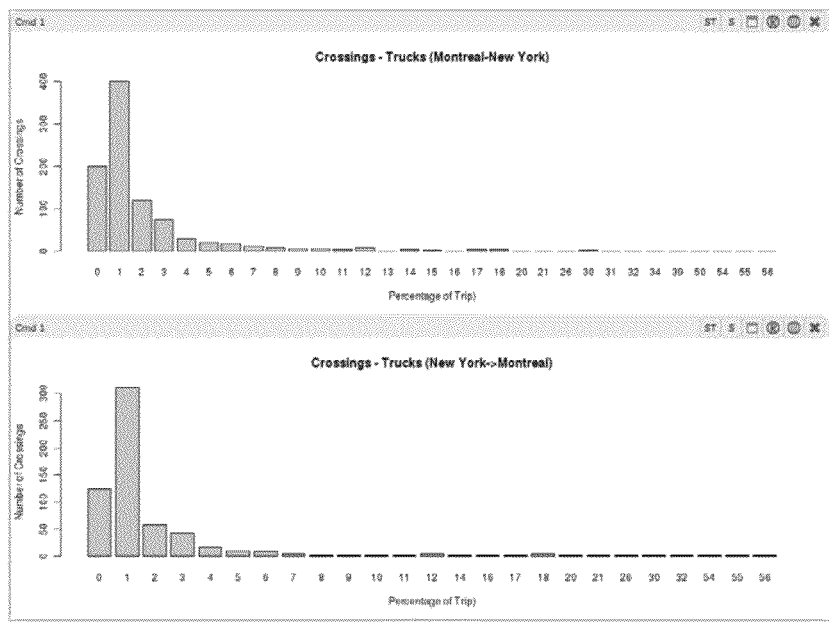
FIG. 5B is a representation of a data visualization created using the geospatial platform.

The result from this code statement is a custom visualization, shown in FIG. 5B, using the dashboard's image visual metaphor. The statistical routines have full access to position and movement data stored within the platform database. Thus it is possible to create custom and powerful statistical routines to perform ad hoc analysis. By re-submitting and re-running the R code statements, the analytic platform has a quick edit-debut cycle which make is productive to create new analyses.

Executing a code statement that is a SQL query is always a table. The dashboard 137 binds a data table to a data visualization 153 through the table column names. Each visual metaphor looks for specific column names in the data table and then uses these columns to set visualization properties. For example, a map visualization as shown in FIG. 6 looks for a column named "wkt" which it expects to contain vector descriptions of spatial objects, e.g. points, lines and polygons, specified using a well-known text markup language. It looks for the "fillcolor" column to set the internal color of any polygon, the "strokecolor" to set the color or any line or outline for a polygon, and the "strokewidth" column to contain an integer setting the pixel width of any line or outline for a polygon.

Figures 6A, 6B, 6C:
FIGS. 6A-6C are representations of a code statement, its results set and the data visualization of the results set.

The query shown in FIG. 6A returns a three column table with "wkt", "strokewidth" and "strokecolor" columns. "Astext(traj)" is a PostGIS SQL function that writes a geospatial column in well-known format. The resulting table is shown in FIG. 6B and its display with the map visual metaphor in FIG. 6C.

This approach to binding data to visual metaphors is flexible. For example, to use the scatterplot visual metaphor, the SQL author creates columns named "independent" and "dependent", which are bound to the x-axis and y-axes of the scatterplot, respectively. For a tracking application, a SQL command could retrieve the last 100 positions of a moving entity and create a "wkt" column specifying "POINT" well-known text and a "fillcolor" column encoding the timestamp of the positions. For an analytics application, the code snippet could access R statistical functions to correlate information and return a probability distribution as a png image.

FIG. 7 lists examples of some column names that may be bound to properties in the visual metaphors. Not every visual metaphor will support all of the bindings. Extra columns are just ignored.

Figures 8A, 8B:
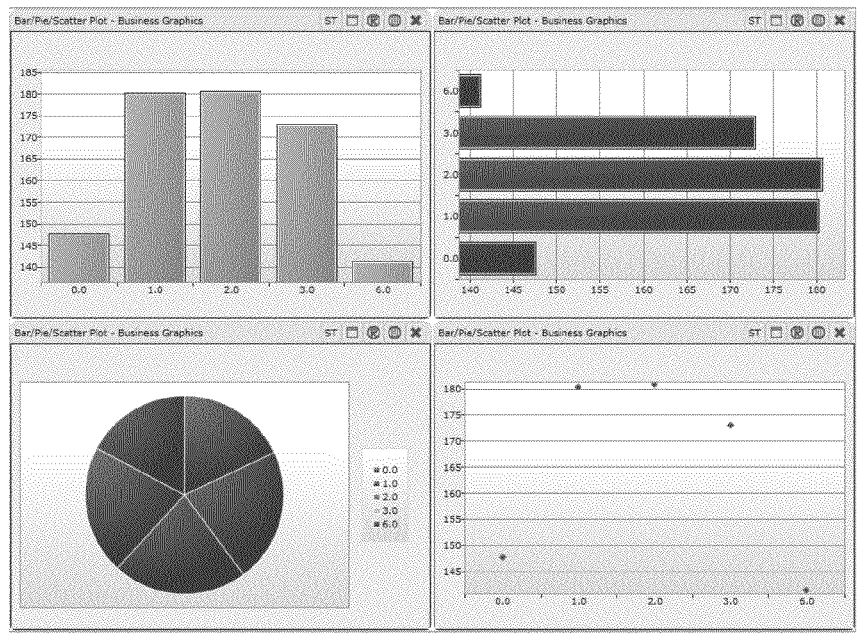
FIGS. 8A-8B are representations of a code statement and the data visualization of the results set.

FIG. 8A shows an aggregate SQL query that calculates the average crossing delay as the dependent variable by day of week ("dow" Postgres function) as the independent variable. FIG. 8B shows the results from this query in a dashboard with standard business charts. Although this example is rather simple, using this approach as the next section will show, it is possible to create rich displays.

A goal of the analytic platform and application is to support real-time analysis. In the dashboard, each data visualization may be set to refresh itself by rerunning its code statement repeatedly so that the data visualization always shows the most current information.

When creating a geospatial analytic application, the user has several ways to control the properties for the data visualizations. One, described above, binds column names to styling properties. The second involves the use of a style editor. This flexible tool enables users to perform on the fly styling by associating visual properties with data values and data ranges. It is possible to style points, lines, and polygons using either algorithms or by editing XML style rules.

All of the tools described above are also available to a user who is using an application created using the analytic platform to analyze geospatial analytic data in an authoring mode. Following is a discussion of how a user may study and interact with geospatial data in real time after an application has been published.

The Silverlight web client shown in FIG. 2 at 138 is a rich internet application (RIA) that is dynamically generated using a series of plug-ins built using Microsoft's Managed Extensibility Framework. As explained above, the web client displays data in a variety of ways, including on a map, on interactive timeline, and in linked analysis charts. The environment provides linking among the tools to help analysts gain insights from the information. By combining the visual components of a map on a single web page, an analyst creates an integrated analytical mashup. The advantage of multiple components is that each presents the mashup events using a different visual metaphor which might be more appropriate to the dataset. Although the analytic platform has been described in terms of Silverlight, other technologies may be used to create the platform, for example, HTML5.

Figure 9:
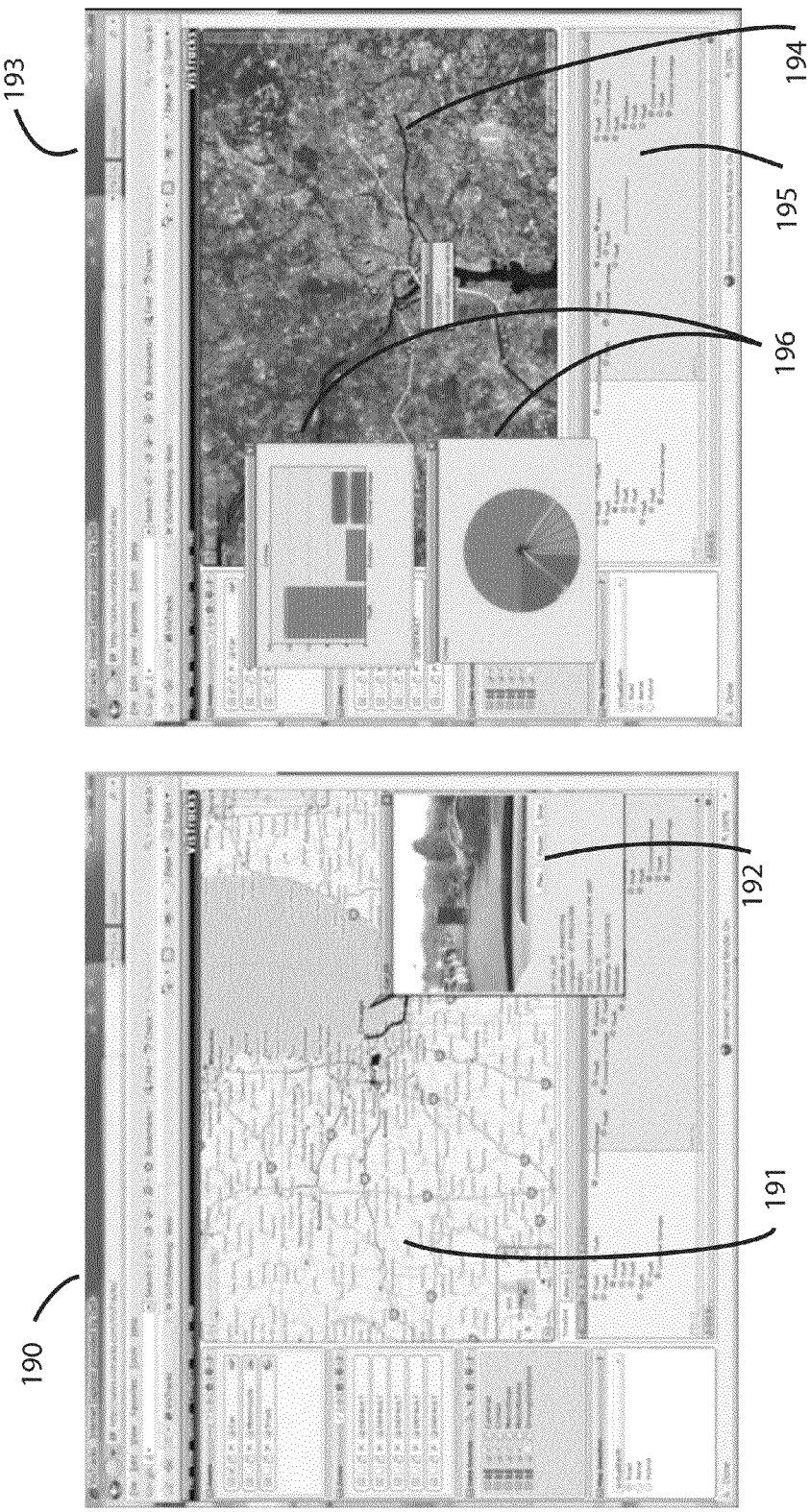
FIG. 9 is a representation of data visualizations created to analyze crime locations.

A sample of a dashboard that has been created for data analysis is shown in FIG. 9. The image 190 on the left shows real-time vehicle tracking 191 with live imagery 192 from the vehicle and the right image 193 shows spatial-temporal analysis of crime locations on a map 194, on a timeline 195 and summarized in the linked analysis charts 196. The visual components are interactive. The user may grab either the map or timeline with the mouse and drag it around. As this occurs the map and timeline pan smoothly. The way this works is as the map is panned, the Silverlight asynchronously requests new image tiles. Rolling the mouse scroll wheel causes the map and timeline to zoom in and out. When the user zooms in, the map animates between zoom levels using five discrete steps.

Figure 10:
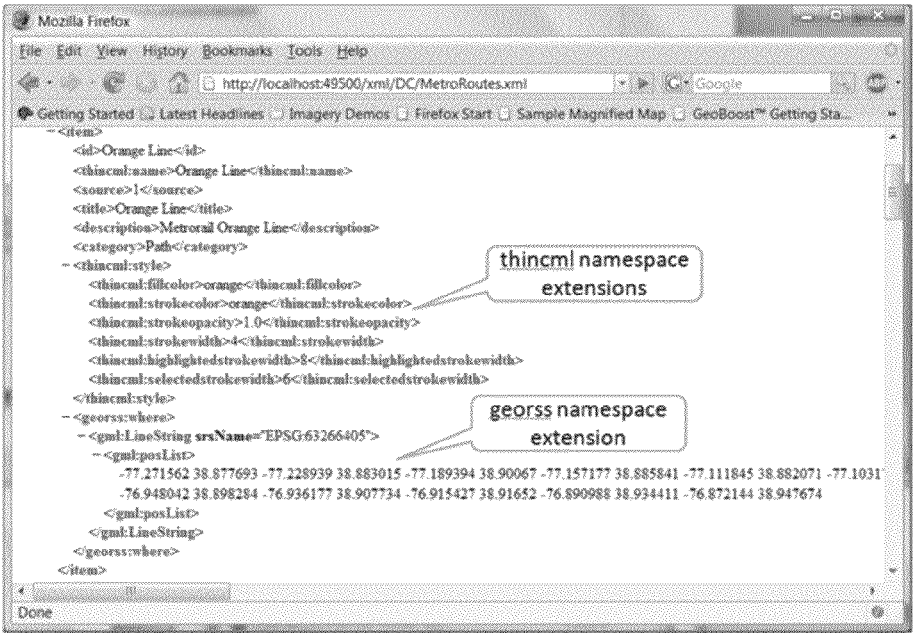
FIG. 10 is a representation of GeoRSS representation describing a subway line.

The most common way to load data into the client is via a GeoRSS feed. GeoRSS, a simple extension to the RSS specification, is a flexible format for either historical or real-time spatial data. To specify the location within a GeoRSS stream, there is an RSS namespace extension <georss:where> node where arbitrary shapes may be specified using geography markup language (GML). For example, FIG. 10 shows the GeoRSS item describing a subway line. The physical location of the subway line segments is specified using a <gml:LineString> as a sequence of latitudes and longitudes.

Within the GeoRSS specification, there is no capability to define drawing styles, for example, colors and line thicknesses, for the subway routes. To address that need, GeoRSS is extended using a namespace extension to add styling properties and certain shapes that are needed for the application. The shapes added are ellipses, sectors, and slices of a circle. Although these shapes could be represented in GeoRSS using a GML generic polygon, it is rather cumbersome. To avoid any namespace clashes, all the extensions into the thincml namespace. For example, the following specification represents a sector of a circle or a pie wedge if the inside radius is zero:

```
<georss:where>
  <thincml:sector center="38.82, -77.12"
  radius="4000" insideradius="3000"
  startangle="90" arcangle="45"/>
</georss:where>
```

The dashboard display and analytic platform has the capability to load streams of positions published as GeoRSS. A stream may represent static information such as the locations of buildings or dynamic information such as recent earthquake locations. For dynamic feeds, the dashboard monitors each data stream and periodically polls it to access the latest information. The streams appear on the client as layers and may be manipulated in the linked analysis charts.

Figure 11:
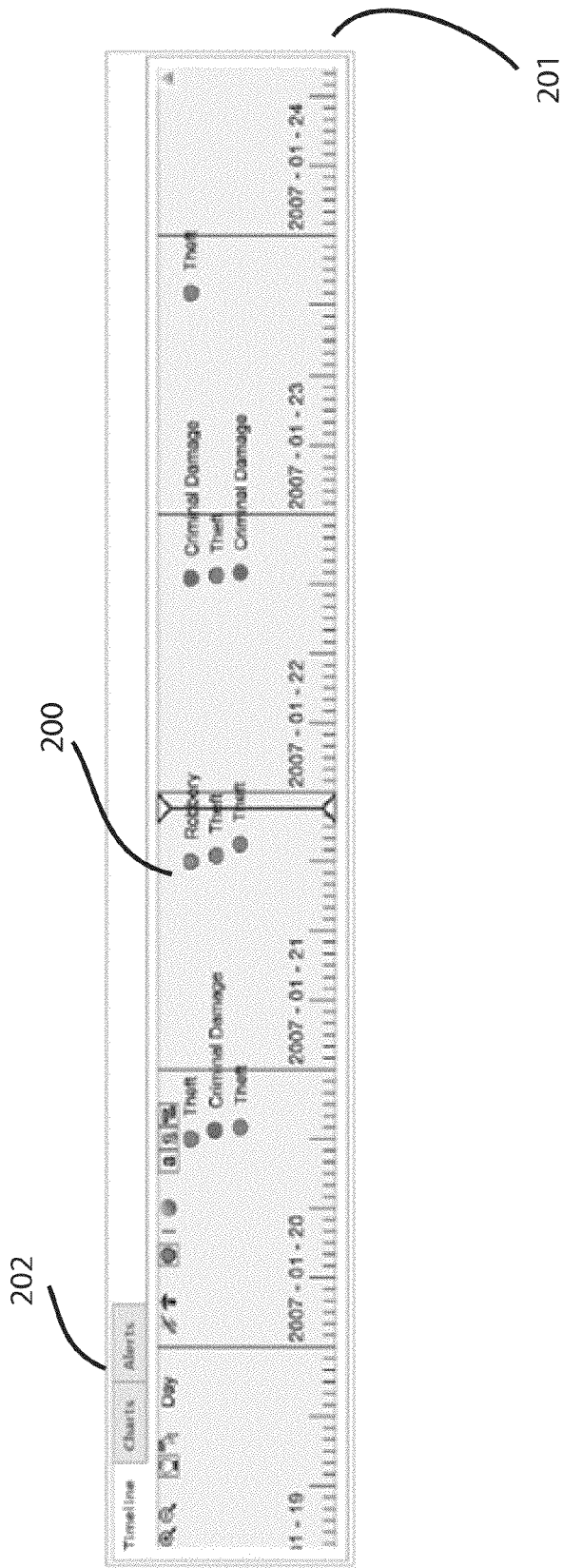
FIG. 11 is a representation of timeline data visualization.

One of the standard tags in a GeoRSS stream is a timestamp for each item. As shown in FIG. 11, the interactive timeline is a light weight component for visualizing and interacting with time-stamped data. It includes a number of innovative features:

It positions time-stamped items 200 from a linked map on the timeline.

It supports interactive panning and zooming.

It provides synchronized detail timeline and overview timelines.

It enables both watch mode where new events are automatically positioned and analysis mode where the display does not automatically update.

It pans to most recent events in watch mode.

It supports multiple time scales 201 including hour, day, week, and month.

It links to other visualizations such as the map using tooltips and selection.

It provides rich API to program against.

It includes built in toolbar 202.

It increases visual scalability using an over plotting indicator.

It uses a best fit algorithm to position labels to avoid over plotting.

The timeline visualization of FIG. 11 can be thought of as a series of rectangular tiles that each represents one unit of time and are placed horizontally to fill up a specified number of pixels on the web page. The unit of time represented depends on the scale of the timeline, which can be set to year, month, day, hour, minute, or second.

Timelines are interactive. As the user drags a timeline to the left or right using the mouse, new tiles are created and destroyed to give them the impression they are 'panning' through time. This style of interaction is intuitive and easy to understand for users. In addition, simple buttons on the toolbar allow the user to zoom the timeline in or out, change the current timeline scale, pan to the most recent event, and reset the timeline scales.

Figure 12:
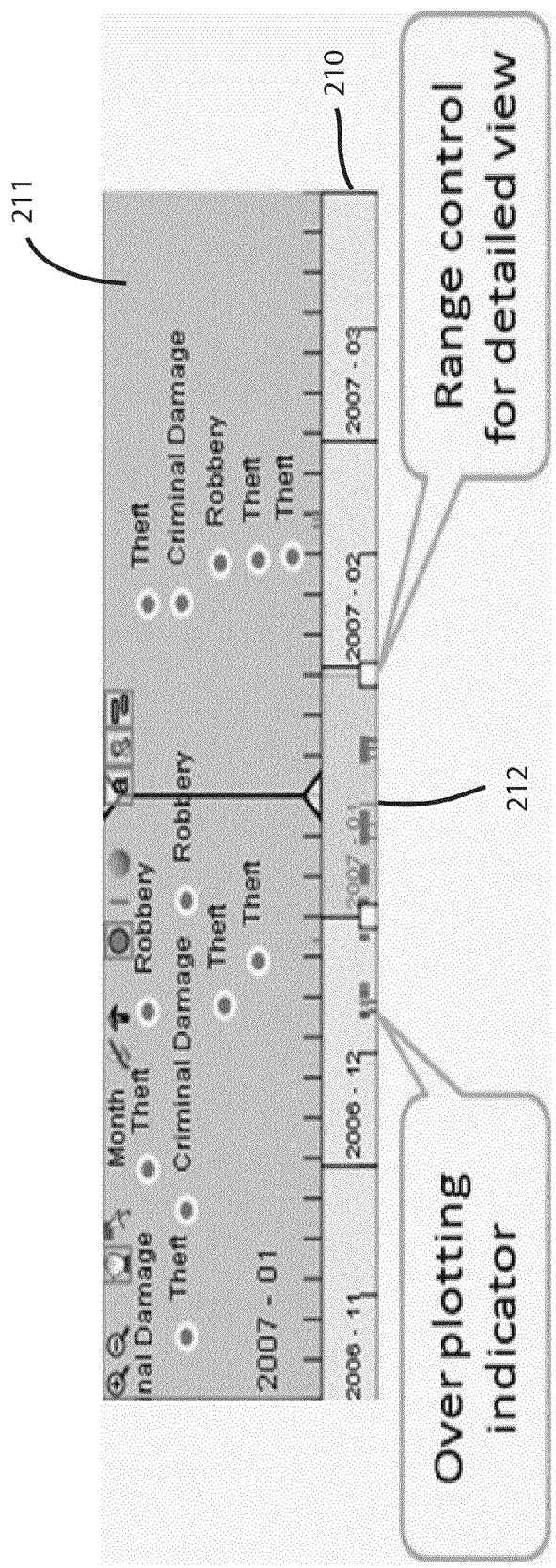
FIG. 12 is a more detailed representation of a timeline data visualization'

FIG. 12 shows a synchronized overview and detail of an interactive timeline. The overview timeline 210 shows months on a compressed scale and the detailed timeline 211 is greatly expanded. Each tile is labeled with its starting date and end date. Small vertical dashes are placed intelligently on the tile to indicate familiar time intervals and subintervals. For instance, day tiles would show each hour of the day as the smaller subinterval marks and the larger tick marks are used to divide the day into quarters. The tiles are automatically generated and labeled using configurable settings for background color and date format. The advantage of using two (or more) timelines is the fact that they can be synchronized together. As the user manipulates one of the timelines, the other timeline scrolls accordingly. The highlighted areas 212 in the center of the overview timeline 210 represents the entire time period displayed in the detailed timeline 211. This capability is desirable when attempting to display a summary level and detailed view of the same data.

For rendering the timeline, one approach is to plot objects corresponding to the data items on the timeline canvas. This approach could support basic interactive operations like tooltips, selecting and highlighting individual items, or toggling an item's visibility. However, implementing more advanced features such as hiding a group of items becomes computationally expensive. A second disadvantage of this implementation is that it does not extend gracefully to display data from several RSS feeds. To overcome these problems, the implementation renders events from distinct RSS feeds as separate transparent overlays on top of the raw timeline canvas. Each overlay is independently populated using the appropriate feed and styling properties. The advantage of this approach is that it is easy to add or remove a feed from the timeline or to configure properties of a feed, such as toggling its visibility, because the feed corresponds to a single overlay on the timeline which can easily be manipulated by setting document object model (DOM) properties.

The analytic platform also allows selection and linking between a timeline and a map. Sometimes a user wants to know when a closely related set of geospatial events occurred or where a set of temporally related events occurred. To help answer these questions, data items on the map and timeline are linked to enable analysts to spot temporal and spatial relationships. Data items are linked in three ways. First, when the user holds the mouse over a data point on the timeline, the corresponding data point on the map is highlighted.

Figure 13:
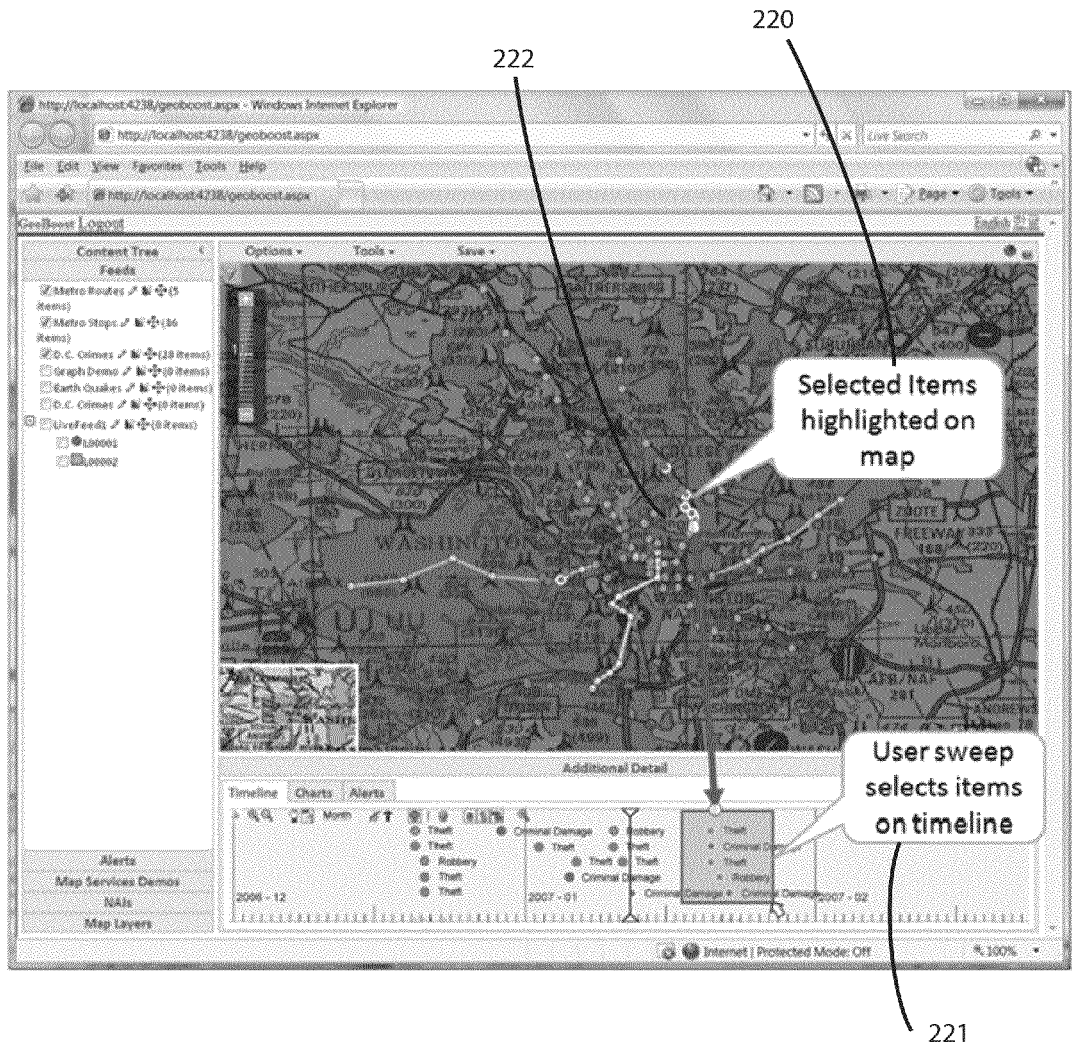
FIG. 13 is a representation of linked map and timeline data visualizations where some items have been selected.

Second, as is also shown in FIG. 13, the user is able to sweep select groups of items. In this mode, the user sweeps out a region and thereby selects a set of items. Instantly, these items are highlighted on both the timeline and map displays. In FIG. 13, the user is in the process of selecting a group of items 220 on the timeline, which will also tell 'where' these events occurred by watching the map display change as the linked items are selected. Sweep selecting on the map tells the user 'when' the events occurred by observing the changes in the timeline 221. In the example, the sequence of selected crimes that occurred over a several hour period all took place along line 222. More importantly, however, this operation causes the selected data items on the map and timeline instantly to be highlighted as shown by the white outlines, and thereby helps the user to visualize the 'where' and 'when' about the object's events. Selection and linking unify the data across the visualizations and allows the analysts to construct a mental model of the events in both time and space.

Third, the user also is able to change the glyphs and icons on the display. In this scenario, showing crime patterns along subway lines, the crimes are displayed as simple color-coded circles with color indicating the crime type. The user could, for example, go into the properties of the data feed, and change the styling so that 'robbery' crimes display as yellow triangles, and 'violent crimes' as purple squares. In this way, the user is able to stratify the visualization, searching for latent patterns.

In monitoring mode, the analytic application constantly polls for the new events and renders these events on the map and timeline. Eventually, the map will become cluttered with too many items and too much information. For situational awareness applications, old information is often not relevant to the current state and is distracting. To help minimize visual clutter, the analytics platform has several options involving event fadeout. These include A) a polling frequency which determines the frequency that the RSS provider is accessed to request new items, B) a fade out period which causes items on the map and timeline to gradually fade and disappear to avoid cluttering the display with stale information and C) panning to latest item causes either the map, timeline or both to pan to any new events as they arrive.

While viewing data on a map and timeline is helpful, it is limited in that it is only possible to spot certain types of patterns and outliers in the data. What is missing is a capability to correlate spatial and nonspatial dimensions. To overcome this limitation, the analytic platform allows the user to create linked sets of visual components. Each visual component shows the data items using its own visual metaphor. The items in each visual metaphor are linked so that tooltips and selections propagate among the visual metaphors.

Figure 14:
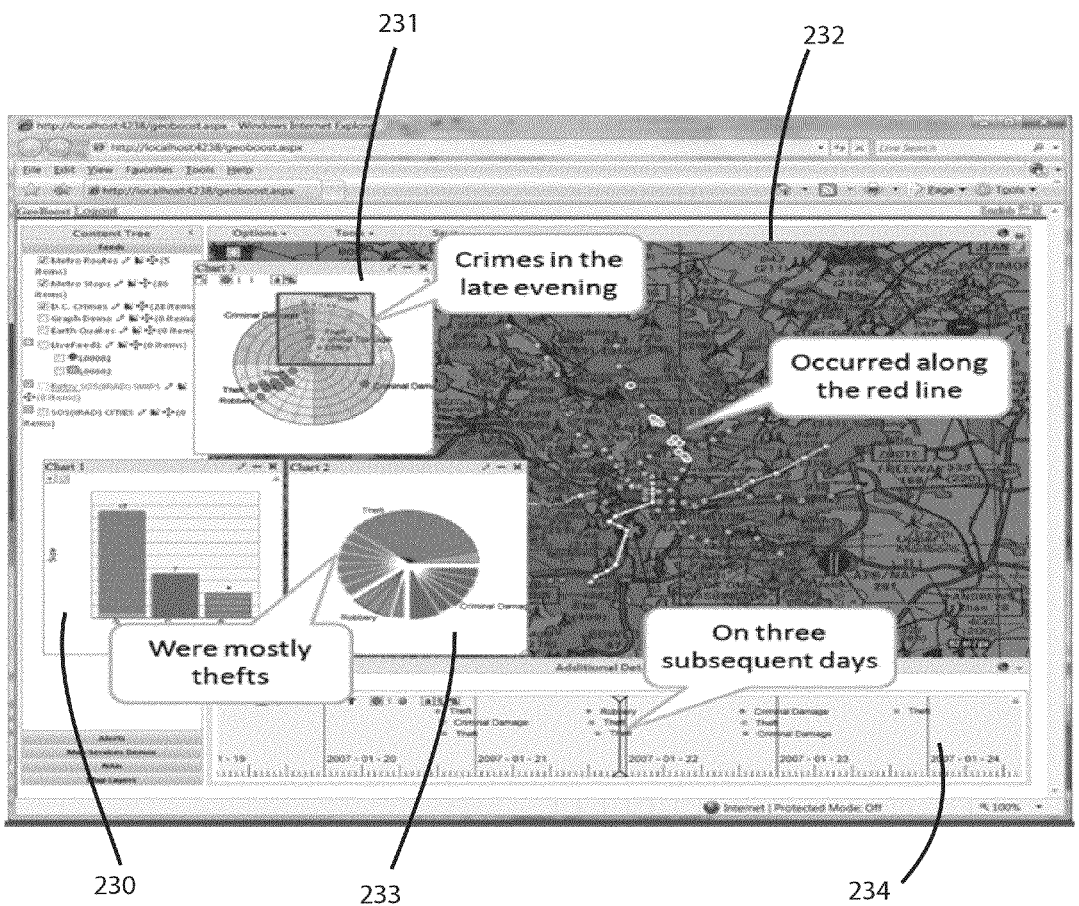
FIG. 14 is a representation of several linked data visualization components.

Using a geospatial analytic application created using the analytic platform, a user performs ad hoc analysis by dynamically creating linked visualizations. As shown in FIG. 14, the user instantiates linked analysis components dynamically. These analysis components are resizable and movable and can even be minimized into the data tray at the bottom. Since each window is live, as new data points are ingested into the system, the visual components will rerender as needed.

With this powerful tool, the user is able to construct a mental model for the dataset, and do fine grained analysis of portions of the data as they expand and peer into the data. Since the tools are dynamic, the user is able to filter the data, and then construct graphs from the browser. For example, as shown in FIG. 14, the analyst may use the bar chart 230 to filter the crimes data by selecting the 'Robberies' and then create a time wheel 231 to see when the crimes were reported to discover if there is a pattern in the time dimension. The time wheel is a 24-h clock with the day of week shown as concentric circles starting with Sunday. By displaying the crimes on the map 232, the analyst is able to see if there is a geographic pattern as well. Since the displays are linked, the user is able to sweep select regions and see them highlight on the other visualizations 233, 234. With these linked components, the analysts are able to discern whether a robbery is a single crime of chance, or part of a larger pattern indicating more organization. The analyst is able to quickly stratify the data and look for patterns. The lightweight and ready access to the data enable the user to arrive at conclusions quickly to take action.

Selection and linking help users to identify patterns in the data which are difficult to see without these charts. For example, the bar chart 230 shows that the number of thefts is about 2.5 times greater than the number of criminal damage complaints which is approximately 50% larger than the number of robberies. Selecting the crimes on the time wheel 231 which occurred late at night and correlating these items with their locations on the map 232 show that most of these crimes occurred along the red line. Noticing these events in the timeline 234 shows that they occurred on a sequence of 3 days. Furthermore, there appear to be two distinct patterns of events on the time wheel. These are a sequence of crimes 233 in the early evening and another sequence in the late evening and early morning. There is one exception. One criminal damage incident occurred in the early morning as indicated by the single green circle.

Sample Use Case One: Smart Routing to Increase Safety

This example illustrates how mapping, routing, tracking, and spatial analysis may be combined to solve a particular use case. The goal of this hypothetical example is to route a vehicle from the airport in Amman Jordan to the US Embassy. The constraints are that the vehicle should randomly vary its path from previous trips, should avoid historical incidents, and should dynamically calculate a new route if an incident along the planned path is observed on a video monitoring system in the city. The routes should provide a secure buffer zone.

Figure 16:
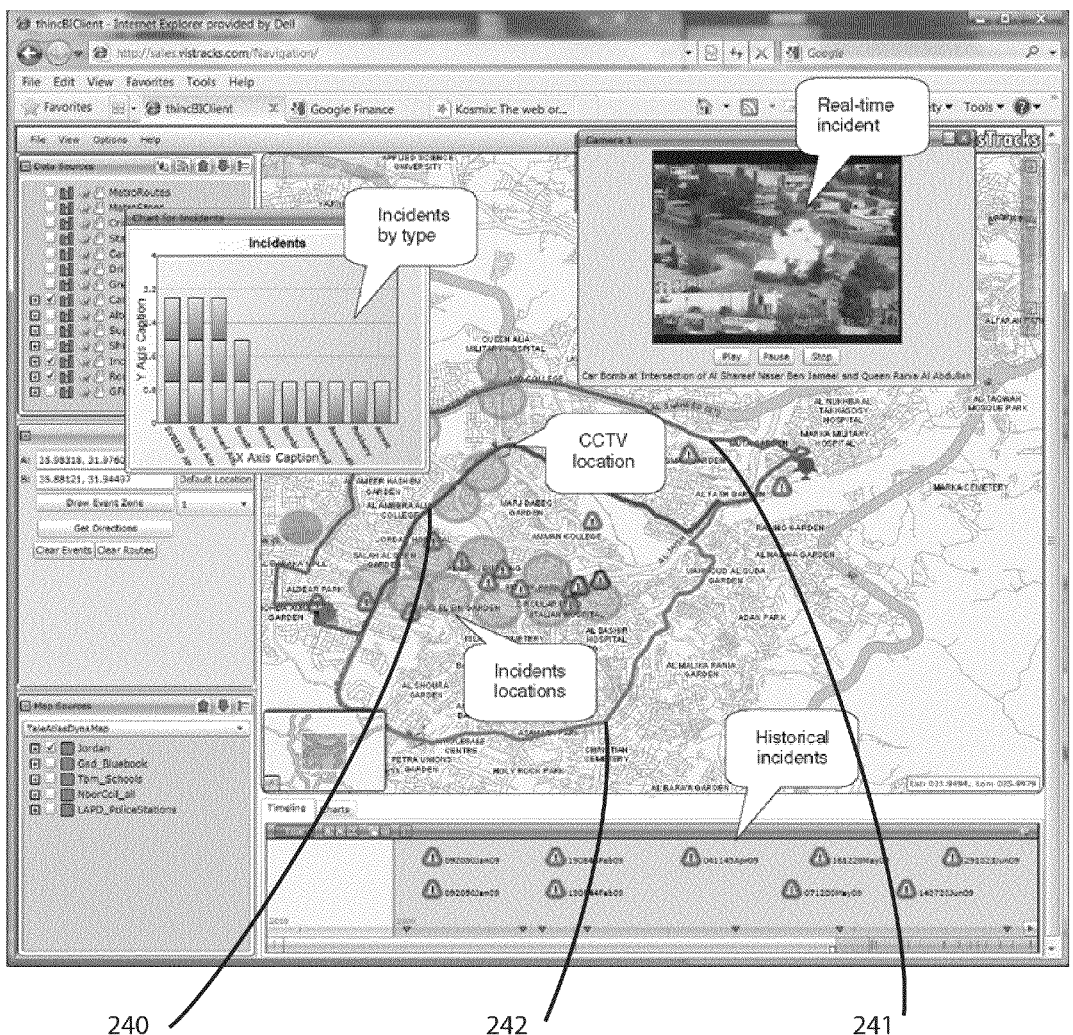
FIG. 16 is a representation of data visualizations used to plot a safe route between two locations.

To illustrate this case, a synthetic dataset of historical incidents is used to plot safe routes. As shown in FIG. 16, the incidents are positioned spatially on the map, temporally on the timeline, and shown in the linked bar chart summarizing past incidents by type. Using map server 101 of FIG. 1, we have generated a high-quality map of Amman roads showing the major and minor arteries. Using navigation server 102 of FIG. 1, we created three routes from the Airport to US Embassy. The shortest route 240 passes too close to past incident locations. A second route 241 avoids the historical incidents but passes by a video camera showing a car bomb exploding—clearly it is desirable to avoid this area. A third route 242 avoids the danger zone caused by the explosion and the historical incidents. Clearly we could also incorporate historical routes by incorporating information from the tracking server and thereby ensure that the routes are randomized.

Sample Use Cast Two: Heat (Choropleth) Maps

In another embodiment, the analytic platform can be user to generate heat maps or choropleth maps. These maps are a common technique to encode spatial information associated with regions on a map using a false color scale. In a heat map the color of each region is tied to the numeric statistic such as population density, per capita income, or in this example, a number of events, that is associated with the region using a color scale. The regions may be geopolitical, e.g. country, state, province, metropolitan statistical region, or census tract, or may use custom regions such as sales territories for a particular company.

To create a heat map using the analytics platform two useful functions are provided:

vt_heatmap(query text, geographic_level text, color_scale text)—accepts a query, geographic level and color scale as input, executes the query, and creates a heat map at the designated level and color for the results from the query.

vt_heatmap_census(census_var text, geographic_region text, geographic_level text, color_scale text)—creates a heat map for a census variable for the specified geographic region and level. Available geographic levels are 'state', 'MSA', 'county', 'tract', 'blkgrp', and 'blk', which correspond to census data.

FIG. 17a shows four uses of these two functions. The query passed to vt_heatmap, 'select astext(location) as wkt from vt_getCurrentPositions( )' returns the current positions of a set of moving entities which are then used to generate the heat. The geographic level are 'state' and 'country'. The results from running the four queries in FIG. 17a are shown in FIG. 17b.

Figure 18:
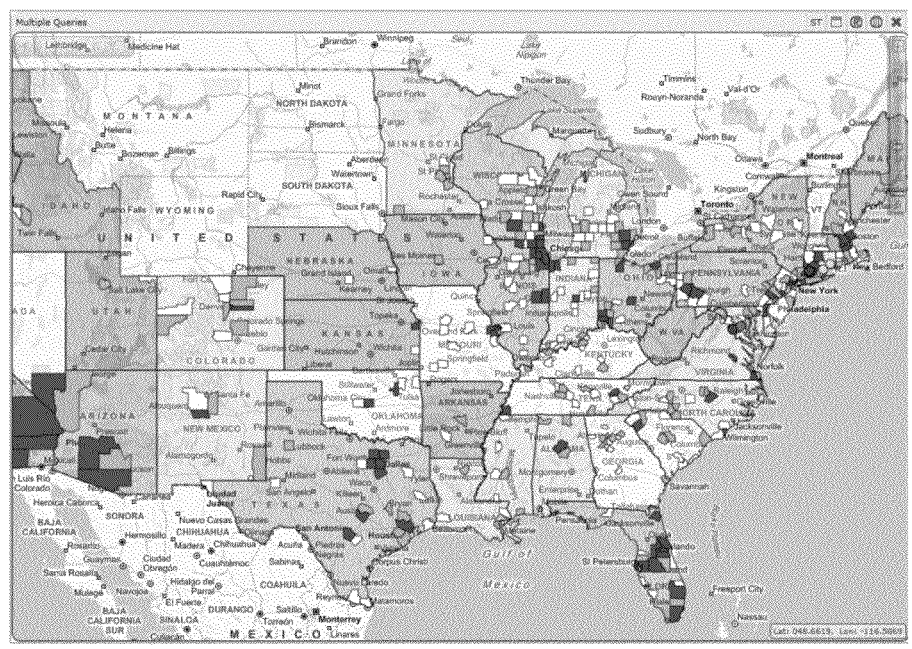
FIG. 18 is another representation of the data visualization of FIGS. 17A-B.

In some situations it is useful to display several layers of feature data on a map. The way this works is that users may drop multiple code snippets onto the map and the layers will then stack forming a composite layer. FIG. 18 shows a composite heat map with the same data aggregated at both the state and county levels using the 'PuOr' and 'Spectral' color scales, respectively.

Sample Use Case Three: Analyzing Time-Based Count Data

Figures 19A, 19B:
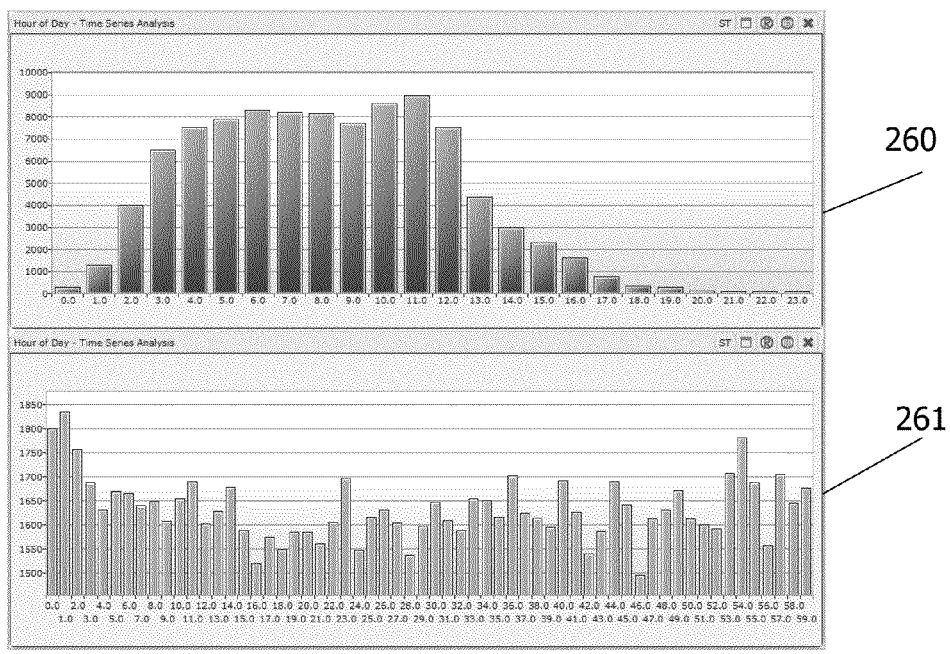
FIGS. 19A-B are representations of code statements and the resulting data visualization for analyzing time-based count data.

A useful technique for analyzing event data is to look for temporal patterns in the number of events through time. SQL's "extract" and "count" functions are useful to create aggregate statistics measuring event patterns within designated time scales. FIG. 19a shows two SQL queries that extract the minute and hour or telephone calls made by employees of a large international company with significant overseas and geographically dispersed operations. The results from executing these queries are shown in FIG. 19b. The nearly constant hourly calling pattern 260 encodes calling activity during work hours, which start early for this company because of time zone differences. The minute-by-minute calling activity plot 261 shows that there is a definite uptick in minute-by-minute calls during the first few minutes beginning on the hour.

Sample Use Case Four: Analyzing Event Data at Different Time Scales

Figure 20:
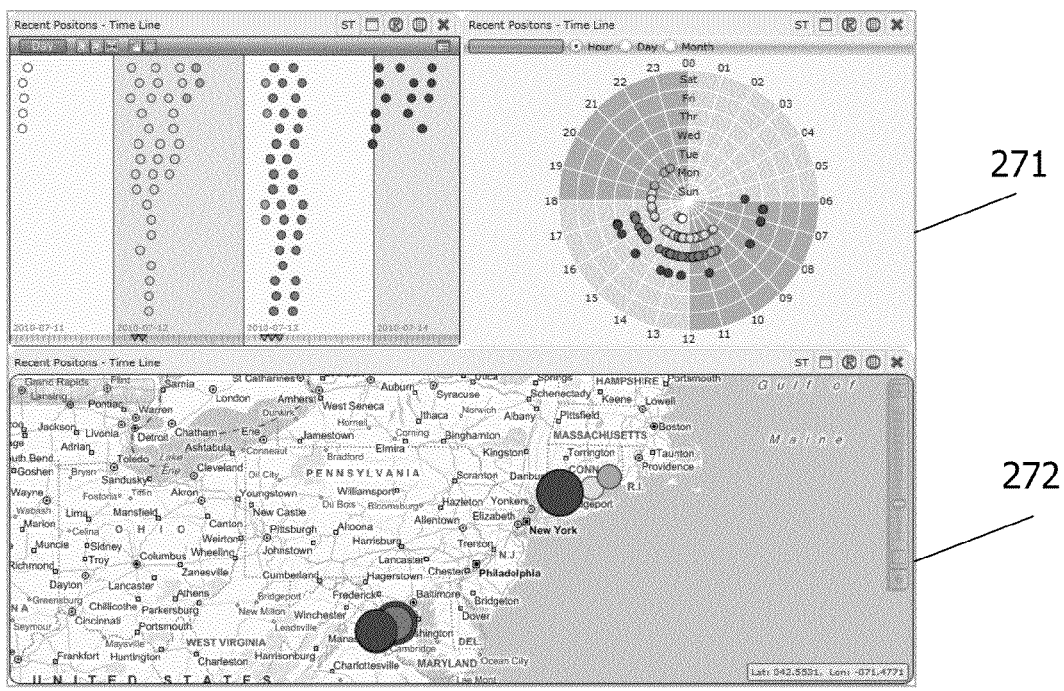
FIG. 20 is a representation of data visualizations used for analyzing event data at different time scales.

FIG. 20 shows a sequence of temporal events using three different visual metaphors that show the event data in different ways at different time scales. The events are shown on an interactive timeline 270, on time wheel 271, and on an interactive map 272. On time wheel 271 the radial displacement of each event is tied to hour and the distance from the origin is tied to day of week. The events are shown as green points with lightness tied to the event date. There is a clear pattern. There are no events in the early morning hours, e.g. between 23:00 and 5:00, and then the majority of the events occur on Monday and Tuesday in the New York and Washington D.C. areas.

Sample Use Case Five: Analyzing Vehicle Movement Patterns

For position and movement data, a trajectory represents the continuous movement of an entity between stop. A stop point is a location where the entity is stationary for an extended period of time. A trip is a sequence trajectories and stop points between an origin and a destination.

Figure 21:
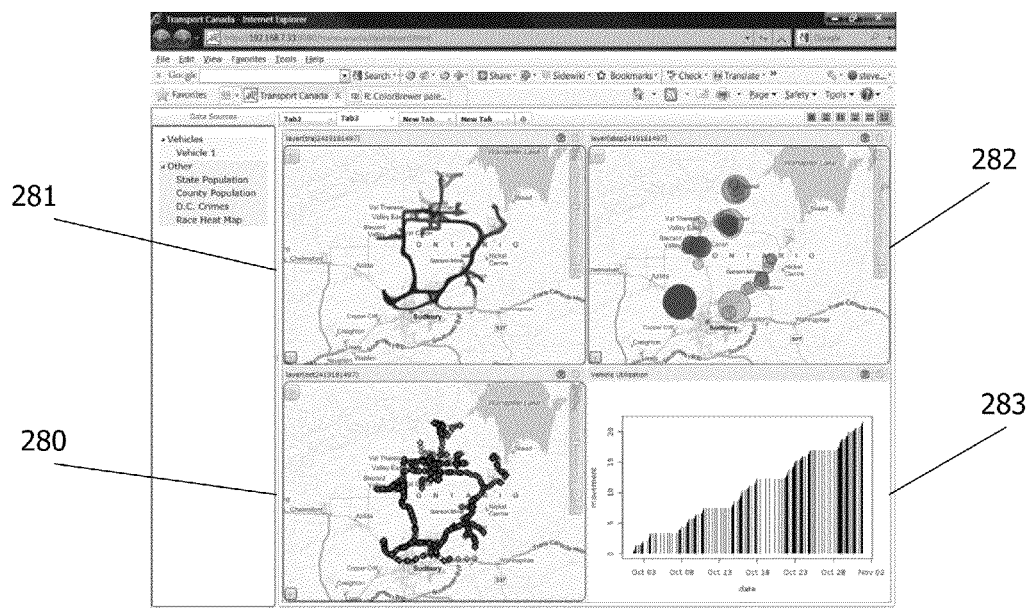
FIG. 21 is a representation of data visualizations used for analyzing vehicle movement patterns.

FIG. 21 shows the movement patterns of a vehicle, which happened to be a large class 5 truck, over a one month period. The positions, sampled every 5 minutes, are shown in the lower left dashboard pane 280. The trajectories are shown in the upper left pane 281. When multiple trajectories overplot the depth of the color increases, showing the most common trajectories. Similarly the stop points are shown in the upper right pane 282 with the size of the glyph radius encoding the length of the stop. The areas of darker color indicate frequent stops, perhaps indicating locations where the vehicle is parked overnight. This vehicle follows the same route during much of the month. The plot in the lower right pane 283 shows the time periods when the vehicle was stationary and in movement. In this plot time increases along the x-axis and the cumulative vehicle movement is shown using the y-axis. The four level plateaus represent weekends where the vehicle was parked and unutilized.

Figure 22:
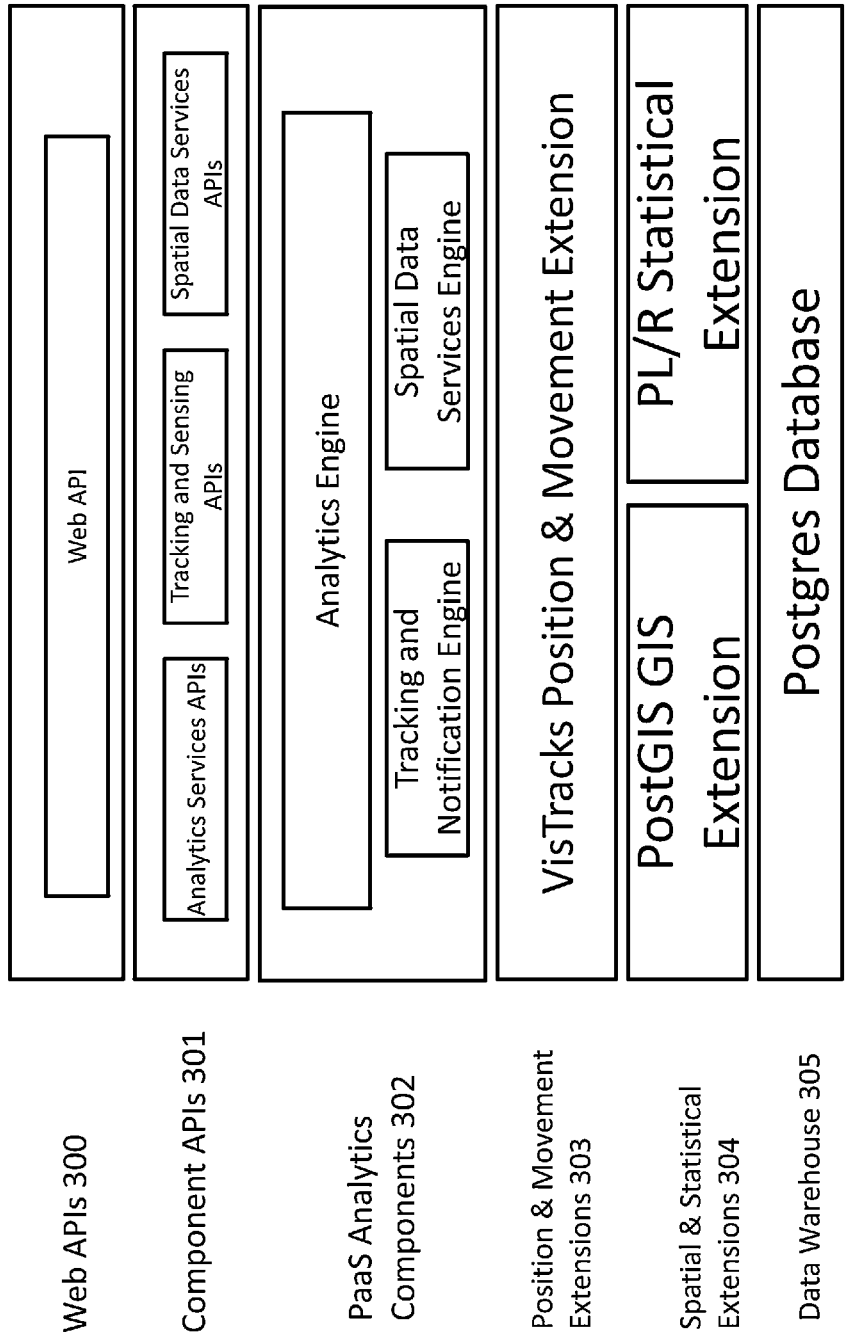
FIG. 22 is a representation of a server-side technology stack used to implement the geospatial platform.
Figure 23:
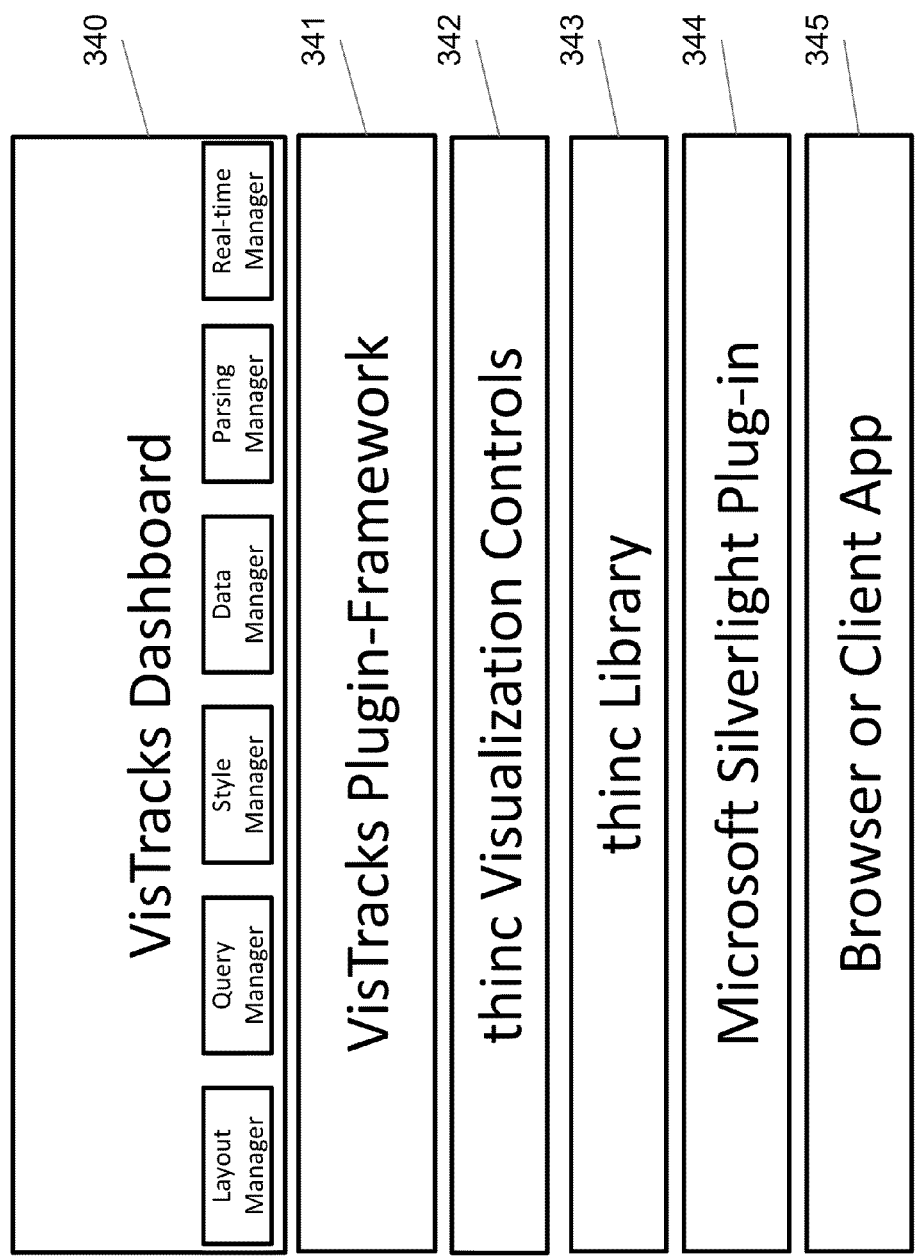
FIG. 23 is a representation of a client-side technology stack used to implement the geospatial platform.

A representation of the software stack, or components used to implement the disclosed geospatial platform is shown in FIGS. 22 and 23. FIG. 22 shows the stack used on the server side of the system, while FIG. 23 shows the stack used on the client side.

At the base of the stack in FIG. 23 is a PostgreSQL (Postgres) database 305 which is a multi-tenant spatial database for storing all of the real-time and location-based data, as well as all other data used in the operation of the geospatial database. Next are PostGIS and PL/R Statistical Extensions 304 that add support for geographic objects and statistical computing to the Postgres database. A position and movement extension 303 provides support for the special functions provided by the disclosed geospatial platform and aids in processing code statements.

The PaaS analytics components 302 and Component APIs 301 are as described above in connection with FIG. 2. Finally a web API 300 provides an interface, or dashboard, for accessing all the layers below. This Web API can be provided by Javascript or Silverlight as explained in connection with FIG. 2, or by other suitable means, for example, HTML 5.

In FIG. 23, a software stack on the client side of the geospatial platform is depicted. At the base is a browser or other client application 345 that provides the basic functionality of the platform. A Microsoft Silverlight Plug-in 344 adds functionality for writing rich internet applications, although other platforms such as Javascript or HTML 5 could be used. Library 343 and visualization controls 342 provide various functions needed to develop applications using the geospatial platform. Plug-in Framework 341 adds further customization to the browser environment as explained in detail above. Finally, dashboard 340 includes several components, for example, layout, query, style, data, parsing and real-time managers, to facilitate using the geospatial platform to create an analytic application.

Figure 24:
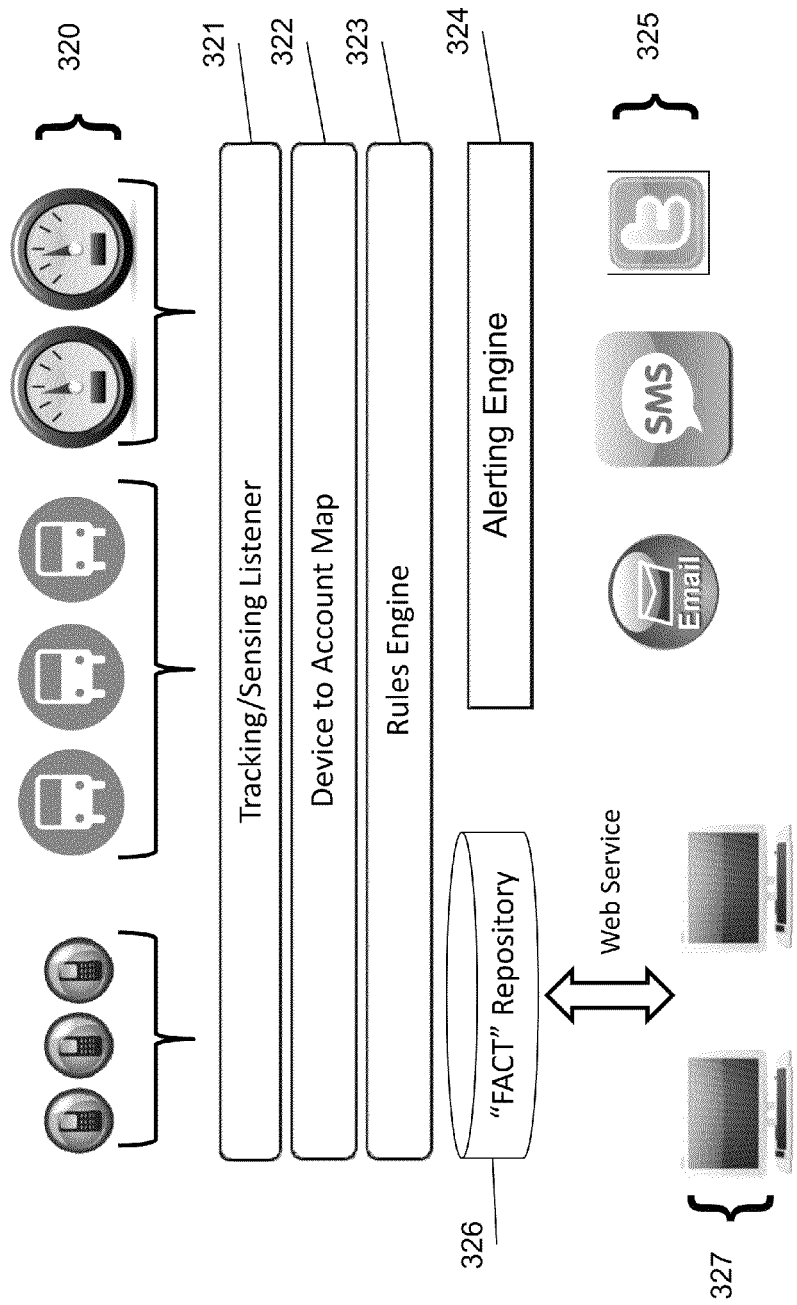
FIG. 24 is a representation of tracking and sensor services incorporated in the geospatial platform.

FIG. 24 is a representation of the interaction between the geospatial platform as described above and the wide variety of input devices and communication technologies which are available for collecting and sharing wireless real-time and spatial data. Input devices can include but are not limited to, for example, cellular phones, vehicle sensors and gauges 320. These devices are connected to a tracking/sensing listener 321 which feeds their data to a device to account map 322 for further propagation to repository 326. Rules engine 323 detects certain events or combinations of events in the tracked data and sends a notification to alerting engine 324. Alerting engine 324 sends notification using, for example, email, short message service (SMS) or Twitter, although any appropriate communication means could be used. Repository 326 is the main database for the geospatial platform accessed by means of a web service 327 as explained above.

The geospatial platform in one example employs one or more computer-readable signal-bearing media. The computer-readable signal-bearing media store software, firmware and/or assembly language for performing one or more portions of one or more implementations of the invention. The computer-readable signal-bearing medium for the disclosed geospatial platform in one example comprise one or more of a magnetic, electrical, optical, biological, and atomic data storage medium. For example, the computer-readable signal-bearing medium comprise floppy disks, magnetic tapes, CD-ROMs, DVD-ROMs, hard disk drives, and electronic memory.

The steps or operations described herein are just for example. There may be many variations to these steps or operations without departing from the spirit of the invention. For instance, the steps may be performed in a differing order, or steps may be added, deleted, or modified.

Although example implementations of the invention have been depicted and described in detail herein, it will be apparent to those skilled in the relevant art that various modifications, additions, substitutions, and the like can be made without departing from the spirit of the invention and these are therefore considered to be within the scope of the invention as defined in the following claims.

What is claimed is:

1. A geospatial platform for creating data analysis applications for visualizing time and location data sets, comprising:
    a server for receiving a plurality of time and location data sets from a plurality of sources, and for executing code statements that select data from a selected data set of the plurality of time and location data sets and format it according to a data visualization, wherein at least one of said code statements is an R statistical algorithm;
    a computing device, coupled to the server, having a display for showing a plurality of data visualizations which can be selected and a plurality of code statements which can be selected, said display also showing data visualizations based on the execution of code statements by the server; and
    input device for choosing a code statement and matching it with the selected data set and the selected data visualization, then sending the code statement to the server for execution.

2. The geospatial platform of claim 1 wherein the code statements can be written to execute repeated so that the data visualizations are updated on the display in real-time.

3. A method for creating real-time data analysis applications by a developer using a computing device, comprising:
    displaying a list of one or more data visualizations on the computing device;
    displaying a list of one or more time-stamped data sets on the computing device;
    entering into the computing device, by a developer, a code statement describing an association between a selected data visualization and a selected data set, wherein the code statement is an R statistical algorithm;
    executing the code statement by a server operatively coupled to the computing device, the server accessing the selected data set and creating a results set which is bound to the properties of the selected data visualization; and
    returning the results set to the computing device for display and interaction by the developer.

4. The method of claim 3 wherein the code statement can be written to execute repeated so that the data visualization is updated on the display in real-time.

5. The method of claim 3 wherein the code statement is a SQL query.

6. The method of claim 5 wherein the results set is a table and the table column names correspond to properties of the data visualization.

7. The method of claim 3 wherein the results set is an image of a probability distribution.

8. The method of claim 3 wherein the results set is a data frame with specified columns.

9. The method of claim 3 where the list of data visualizations comprises one or more of bar charts, pie charts, scatter plots, geospatial maps, timelines, time wheels, text-based displays and statistical algorithms.

10. A computer-based method for use by a developer in creating real-time wireless data analysis applications, comprising:
    providing a dashboard on a computing device, the dashboard including one or more data visualizations and a list of one or more time-stamped data sets;
    entering into the dashboard, by the developer, a code statement for accessing selected data from a specific time-stamped data set, wherein the code statement is an R statistical algorithm;

dragging, by the developer, the code statement and dropping it onto a selected data visualizations from the list of visual metaphors;

executing the code statement and generating a result set, based on the selected time-stamped data set, which is used to display the selected data visualizations on the computing device.

11. The method of claim 10 where the list of data visualizations comprises one or more of bar charts, pie charts, scatter plots, geospatial maps, timelines, time wheels, text-based displays and statistical algorithms.

* * * * *